(12) United States Patent
Lakin et al.

(10) Patent No.: US 7,182,602 B2
(45) Date of Patent: Feb. 27, 2007

(54) WHOLE-BODY MATHEMATICAL MODEL FOR SIMULATING INTRACRANIAL PRESSURE DYNAMICS

(75) Inventors: William D. Lakin, Johnson, VT (US); Paul L. Penar, Shelburne, VT (US); Scott A. Stevens, Erie, PA (US); Bruce I. Tranmer, S. Burlington, VT (US)

(73) Assignee: The University of Vermont and State Agricultural College, Burlington, VT (US)

( * ) Notice: Subject to any disclaimer, the term of this patent is extended or adjusted under 35 U.S.C. 154(b) by 415 days.

(21) Appl. No.: 10/658,638

(22) Filed: Sep. 9, 2003

(65) Prior Publication Data

US 2004/0081949 A1 Apr. 29, 2004

Related U.S. Application Data

(60) Provisional application No. 60/416,508, filed on Oct. 7, 2002, provisional application No. 60/409,551, filed on Sep. 10, 2002.

(51) Int. Cl.
G09B 23/28 (2006.01)

(52) U.S. Cl. .................. 434/262; 434/268; 434/272; 703/11

(58) Field of Classification Search ............... 434/262
See application file for complete search history.

(56) References Cited

U.S. PATENT DOCUMENTS

| | | | | |
|---|---|---|---|---|
| 4,003,141 A * | 1/1977 | Le Roy | ............... | 434/270 |
| 5,199,877 A * | 4/1993 | Page | ............... | 434/262 |
| 5,680,590 A * | 10/1997 | Parti | ............... | 703/2 |
| 5,839,438 A | 11/1998 | Graettinger et al. | ........ | 128/630 |
| 5,947,899 A | 9/1999 | Winslow et al. | ............ | 600/410 |
| 6,273,728 B1 * | 8/2001 | van Meurs et al. | ......... | 434/268 |

OTHER PUBLICATIONS

Thoman, William James—A computer Model of Intracranial Dynamics, Oct. 30-Nov. 2, 1997, Proceedings—19th international Coference—IEEE/EMBS, pp. 2197-2200.*

Wang, Eryu—A model of the Dynamics of Intracranial Pressure During Conditions of Intact and Loss of Cerebral Vascular Tone, 1995 IEEE-EMBC and CMBEC, pp. 1515-1516.*

(Continued)

*Primary Examiner*—Kathleen Mosser
*Assistant Examiner*—Cameron Saadat
(74) *Attorney, Agent, or Firm*—Downs Rachlin Martin PLLC

(57) ABSTRACT

A whole-body mathematical model (10) for simulating intracranial pressure dynamics. In one embodiment, model (10) includes 17 interacting compartments, of which nine lie entirely outside of intracranial vault (14). Compartments (F) and (T) are defined to distinguish ventricular from extraventricular CSF. The vasculature of the intracranial system within cranial vault (14) is also subdivided into five compartments (A, C, P, V, and S, respectively) representing the intracranial arteries, capillaries, choroid plexus, veins, and venous sinus. The body's extracranial systemic vasculature is divided into six compartments (I, J, O, Z, D, and X, respectively) representing the arteries, capillaries, and veins of the central body and the lower body. Compartments (G) and (B) include tissue and the associated interstitial fluid in the intracranial and lower regions. Compartment (Y) is a composite involving the tissues, organs, and pulmonary circulation of the central body and compartment (M) represents the external environment.

35 Claims, 9 Drawing Sheets

OTHER PUBLICATIONS

Agarwal GC, Berman BM, and Stark LA: A lumped parameter model of the cerebrospinal fluid system. IEEE Trans Biomed Eng 45-53, Jan. 1969.

Albeck MJ, Gjerris F, Sorenson PS, et al: Intracranial pressure and cerebrospinal fluid outflow conductance in healthy subjects. J. Neurosurgery 74:597-600, 1991.

Chemla D, Herbert JL, Coirault C, Zamani K, Suard I, Colin P, and LeCarpentier Y: Total arterial compliance estimated by stroke volume-to-aortic pulse pressure ratio in humans. Am J Physiol 274 (Heart Circ Physiol 43): 500-505, 1998.

Chopp M and Portnoy HD: Systems analysis of intracranial pressure. J Neurosurgery 53:516-527, 1980.

Czosnyka M, Piechnik S, Koszewski W, Laniewski P, Maksymowicz W, Paluszek K, Smielewski P, Zabolotny W, and Zaworski W: The dynamics of cerebral blood perfusion pressure and CSF circulation—a modelling study. In Avezaat et al. (eds.), Intracranial Pressures VIII. Berlin-Heidelberg, Springer, 699-706, 1993.

Czosnyka M, Piechnik S, Richards S, Kirkpatrick P, Smielewski P, and Pickard JD: Contribution of mathematical modelling to the interpretation of bedside tests of cerebrovascular autoregulation. J Neurol Neurosurg Psychiatry 63:721-731, 1997.

Friden H and Ekstedt J: Volume/Pressure relationships of the cerebrospinal space in humans. Neurosurgery 4:351-366, 1983.

Hakim S, Venegas JG, and Burton JD: The physics of the cranial cavity, hydrocephalus and normal pressure: Mechanical interpretation and mathematical models. Surg Neurol 5:187-210, 1976.

Hoffmann O: Biomathematics of intracranial CSF and haemodynamics. Simulation and analysis with the aid of a mathematical model. Acta Neurochir Suppl 40:117-130, 1987.

Kadas ZM, Lakin WD, Yu J, and Penar PL: A mathematical model of the intracranial system including autoregulation. Neurological Research 19:441-450, 1997.

Karni Z, Bear J, Sorek S, and Pinczewski Z: A quasi-steady state compartmental model of intracranial fluid dynamics. Med Biol Engng Comput 25:167-172, 1987.

Karni Z, Ivan LP, and Bear J: An outline of continuum modelling of brain tissue mechanics. J Child Neuro 1:119-125, 1986.

Lakin WD and Gross CE: A nonlinear haemodynamic model for the arterial pulsatile component of the intracranial pulse wave. Neurol Res 14:219-225, 1992.

Lakin WD, Yu J, and Penar P: Mathematical modeling of pressure dynamics in the intracranial system. Nova Journal of Mathematics, Game Theory and Algebra 5-2, 1996.

Lakin WD, Yu J, and Penar P: Analysis and validation of a mathematical model for intracranial pressure dynamics. Mathematical and Computer Modelling of Dynamical Systems 3:54-73, 1999.

Lewer AK and Bunt EA: Dysfunction of the fluid mechanical cerebrospinal systems as revealed by stress/strain diagrams. S Afr Mech Eng 28:159-166, 1978.

Miller JD: Volume and pressure in the craniospinal axix. Clin Neurosurg 22:76-105, 1975.

Murgo JP, Westerhof N, Giolma JP, and Altobelli SA: Aortic input impedance in normal man: relationship to pressure wave forms. Circulation 62:105-115, 1980.

Nylin G, Hedlund S, and Regnstrom O: Studies of the cerebral circulation with labeled erythrocytes in healthy man. Circ Res 9:664-674, 1961.

Parazynski SE, Hargens AR, Tucker B, Aratow M, Styf J, and Crenshaw A: Transcapillary fluid shifts in the tissues of the head and neck during and after simulated microgravity. J. Appl. Physiol. 71(6):2469-2475, 1991.

Rekate HL, Brodkey JA, El-Sakka W, and Ko WH: Ventricular volume regulation: a mathematical model and computer simulation. Pediat Neurosci 14:77-84, 1988.

Renkin EM, Watson PD, Sloop CH, Joyner WM, and Curry FE: Transport pathways for fluid and large molecules in microvascular endothelium of the dog's paw. Microvasc. Res. 14:205-214, 1977.

Sorek S, Bear J, and Karni Z: A non-steady compartmental flow model of the cerebrovascular system. J Biomechanics 21:695-704, 1988.

Stevens SA: Mean Pressures and Flows of the Human Intracranial System as Determined by Mathematical Simulations of a Steady-State Infusion Test. Neurological Research, 22:809-814, 2000.

Stevens SA, Lakin WD, and Goetz W: A differentiable, periodic function for pulsatile cardiac output based on heart rate and stroke volume. Mathematical Biosciences, 2003 (to appear).

Stevens SA, and Lakin WD: Local Compliance Effects on the Global CSF Pressure-Volume Relationship in Models of Intracranial Pressure Dynamics. Mathematical and Computer Modelling of Dynamical Systems, vol. 6, No. 4:445-465, 2001.

Sullivan H, and Allison J: Physiology of cerebrospinal fluid. In: Wilkins R, and Rengachary S, eds. New York: McGraw Hill Book Co. Neurosurgery 3:2125-2135, 1985.

Taylor AE, Granger DN, and Brace RA: Analysis of lymphatic protein flux data. I. Estimation of the reflection coefficient and permeability surface area product for total protein. Microvasc. Res. 13:297-313, 1977.

Watenpaugh DE, Breit GA, Ballard RE, Zietz S, and Hargens AR: Vascular compliance in the leg is lower than that in the neck of humans. Medicine and Science in Sports and Exercise (Suppl. 5):S26(137), 1993.

Heldt, Thomas, Shim, Eu Bo, Kamm, Roger D., Mark, Roger G.; *Computational Model of Cardiovascular Function For Analysis of Orthostatic Intolerance*. BED-vol. 50, 2001 Bioengineering Conference; ASME 2001; pp. 895-896.

Ursino, Mauro; *A Mathematical Study of Human Intracranial Hydrodynamics Part 1—The Cerebrospinal Fluid Pulse Pressure*; Annals of Biomedical Engineering, vol. 16, Issue 4, pp. 379-401, 1988.

Ursino, Mauro; *A Mathematical Study of Human Intracranial Hydrodynamics Part 2—Simulation of Clinical Tests*; Annals of Biomedical Engineering, vol. 16, Issue 4, pp. 403-416, 1988.

Ursino, M., Lodi, C.A., Rossi, S. and Stocchetti, N.; *Intracranial Pressure Dynamics in Patients with Acute Brain Damage*; American Physiological Society 0161-7567/97; pp. 1270-1282; 1997.

Ursino, Mauro, Lodi, Carlo Alberto; *A Simple Mathematical Model of the Interaction Between Intracranial Pressure and Cerebral Hemodynamics*; Journal of Applied Physiology 82:, pp. 1256-1269, 1997.

* cited by examiner

WHOLE-BODY MATHEMATICAL MODEL FOR SIMULATING INTRACRANIAL PRESSURE DYNAMICS

RELATED APPLICATION DATA

This application claims the benefit of U.S. Provisional Patent Application No. 60/409,551, filed Sep. 10, 2002, entitled "A Mathematical Model for Human Intracranial Pressure and Flow Dynamics," and U.S. Provisional Patent Application No. 60/416,508, filed Oct. 7, 2002, entitled "A Mathematical Model for Human Intracranial Pressure and Flow Dynamics."

GOVERNMENT LICENSE RIGHTS

The U.S. Government may have a paid-up license in this invention and the right in limited circumstances to require the patent owner to license others on reasonable terms as provided for by the terms of Grant No. DMS-96-26391 awarded by the National Science Foundation, and under Grant No. NGT5-40110 and Cooperative Agreement No. NCC5-581 awarded by NASA.

FIELD OF THE INVENTION

The present invention relates generally to mathematical models for simulating intracranial pressure dynamics and more particularly relates to a whole-body mathematical model for simulating intracranial pressure dynamics.

BACKGROUND

Lumped-parameter models represent an attractive method for examining pressure dynamics involving complicated human physiology. In a lumped-parameter modeling approach, the physiological system is subdivided into a number of linked, interacting subunits termed "compartments." In general, each compartment contains a single physical constituent, e.g., blood, cerebrospinalfluid (CSF), or tissue and interstitial fluid. However, depending on the model's complexity, a given constituent may appear in more than one compartment of the model. Dynamics in each compartment is specified by lumped, time-dependent functions giving compartmental pressures, while incremental changes in flows and compartmental volumes are obtained by associating resistance and compliance parameters with adjacent compartments. In particular, interaction between adjacent subunits is assumed to take place at the interfaces of the model's compartments.

With few exceptions, previous models of this type have adopted restrictions known as the "Kellie-Monro Doctrine" to reduce complexity. The Kellie-Monro framework considers the intracranial system to be completely enclosed within the intracranial vault, which is assumed to be rigid. A specified inflow of blood to the intracranial arteries provides a forcing for the system, and outflow from the jugular bulb is assumed to instantaneously equate to this inflow. These restrictions yield a closed system with constant total volume. Strictly intracranial models have produced a number of important results that illuminate the mechanisms of intracranial pressure adjustments in situations involving both normal and pathophysiology. However, the ability of these closed-system models to incorporate the influence of important extracranial factors on intracranial pressure dynamics is clearly limited. For example, the important buffering effects of the spinal CSF space on intracranial pressure cannot be directly included. From a mathematical point of view, the constant volume constraint also produces an over determined system of equations that requires special handling to avoid singular behavior.

Lumped-parameter compartmental models of the present type have a long history, dating to the earliest such model of the intracranial system formulated by Monro in 1783. This first model was bi-compartmental, considering incompressible brain matter and blood as its two constituents. In the work of Monro's student Kellie 40 years later, the vascular compartment was further subdivided into arterial and venous blood to produce a three-compartment model. Since the pioneering work of Monroe and Kellie, increasingly more complex models of the intracranial compartment have been posited in order to more realistically describe the relationship between intracranial pressures and volumes. There has been a steady increase in the number of fluid compartments, the introduction of a separate cerebrospinal fluid compartment, the inclusion of cardiovascular input, and a relaxation of the treatment of system constituents as incompressible fluids and matter. As noted in prior art studies, the intracranial system involves a number of subsystems, which interact through complex mechanisms, and the classical piecewise approach, which often considers CSF dynamics separately, is not suited to studying multiple parameter changes and the effects of interconnected subsystems on each other. By contrast, lumped-parameter models of the intracranial system are capable of including and linking different subsystems, so that such interactions can be examined.

When considering lumped parameter models, it is important to realize that a compartment does not necessarily correspond to a precise physical location in the body. For example, with a single CSF compartment in a model, CSF in the ventricles cannot be distinguished from CSF in the subarachnoid and spinal spaces. This is one of the main limitations of the lumped-parameter approach. Additional spatial resolution can be realized only by subdividing the physical system into a larger number of compartments based on spatial considerations. For example, distinct ventricular CSF and extra-ventricular CSF compartments may be included as opposed to a single lumped CSF compartment. In principle, the entire body could be finely subdivided in this manner into separate compartments to provide the desired degree of spatial resolution. However, clearly this subdivision process cannot be carried to an extreme as the resulting system of linked governing equations will rapidly become too large for practical analysis and solution.

Despite their evolving complexity, two common features characterize most earlier lumped parameter models for pressure dynamics in the intracranial system. The first common feature is an assumption that all resistance and compliance parameters can be represented by constants. This leads to a linear system of governing differential equations. The second common feature is adoption of the "Kellie-Monro Doctrine," which assumes that the intracranial system can be confined within the cranial vault. By requiring that inflow to the intracranial arteries equals outflow from the jugular bulb, this assumption produces a closed system that conserves total intracranial volume.

As mentioned above, when the intracranial space is treated as a closed volume-conserving system contained within the (nearly) rigid cranial vault, important mechanisms for the influence of extracranial physiology on intracranial pressure dynamics cannot be included in the resulting models. For example, the ability of the spinal portion of CSF space to buffer fluctuations of intracranial CSF pressures cannot be directly introduced under the Kellie-Monro Doctrine. At least two prior art mathematical models of intracranial pressure dynamics include aspects of extracranial physiology. The first model includes a compliance for CSF storage within the lumbar channel. The first model contains three compliances, four resistances, and involves differential equations based on a hydrodynamic model for the physical system and its electrical circuit equivalent. The first model allows the dynamic relationship between cerebral perfusion pressure, intracranial pressure, and cerebral blood flow in various states of autoregulation to be studied. Use of the first model in conjunction with clinical data has determined which indices can be derived using transcranial Doppler ultrasonography and which trends of intracranial pressure and blood pressure are useful in clinical tests of autoregulatory reserve. However, despite not strictly abiding by the Kellie-Monro Doctrine, the first model falls far short of being a whole-body model for intracranial pressure dynamics. While the first model can include direct buffering effects of CSF within the lumbar channel, it does not contain other important extracranial physiology. For example, the first model fails to include representations for the extracranial physiology of the cardiovascular system and the tissues and extracellular fluids of both the central and lower body, including cardiovascular autoregulation, colloid osmotic pressure, and a lymphatic system.

The second model uses a single ground compartment to represent the portion of the body below the clavicles. The second model contains three resistances, including a resistance between the intracranial veins and the rest-of-body compartments. Thus, outflow from the intracranial system depends on pressure differences and need not instantaneously equal the specified inflow. The second model also contains three compliances, including a compliance between the CSF and rest-of-body compartment that represents the ability of the spinal portion of CSF space to expand and buffer CSF pressures by compressing the large veins that surround the spinal theca. Two of the three model compliances are pressure dependent. The associated functional forms for the pressure-dependent compliances determined in the second model are used in the present work. The second model still falls short of being a whole-body model for intracranial pressure dynamics. The second model merely lumps extracranial physiology into a single compartment, rather than finely subdividing it into a plurality of compartments. In addition, the second model fails to include the external environment as an implicit compartment.

SUMMARY OF THE INVENTION

One aspect of the present invention is a method of modeling pressure dynamics of a body's intracranial system including the following steps: dividing the body into a plurality of compartments and a heart pump, each of the plurality of compartments representing a portion of the body, the heart pump interacting with at least one of the plurality of compartments; deriving a plurality of differential flow equations, each of the plurality of differential flow equations corresponding to one of the plurality of compartments; and solving the plurality of differential flow equations.

Another aspect of the present invention is a system for modeling an intracranial system including a body compartment module adapted to divide the body into a plurality of compartments and a heart pump, each of the plurality of compartments representing a portion of the body, a flow equation module adapted to derive a plurality of differential flow equations, each of the plurality of differential flow equations corresponding to one of the plurality of compartments, and an equation solver module adapted to solve the plurality of differential flow equations.

Still another aspect of the present invention is a method of modeling pressure dynamics of an intracranial system that further accounts for cerebrovascular autoregulation by a sympathetic nervous system.

Yet another aspect of the present invention is a method of modeling pressure dynamics of a body's intracranial system including the following steps: dividing the body into a plurality of compartments and a heart pump, each of the plurality of compartments representing a portion of the body, the heart pump interacting with at least one of the plurality of compartments, wherein a plurality of the plurality of compartments are vascular and a plurality of the plurality of compartments are non-vascular, the vascular compartments including at least one of the intracranial arteries, intracranial capillaries, choroids plexus capillaries, venous sinus jugular veins, intracranial veins, central arteries, central capillaries, central veins, extra-ventricular CSF, lower arteries, lower capillaries, and lower veins, the non-vascular compartments including at least one of lower tissue, brain, ventricular CSF, and extra-ventricular CSF; deriving a plurality of differential flow equations, each of the plurality of differential flow equations corresponding to one of the plurality of compartments; and solving the plurality of differential flow equations.

BRIEF DESCRIPTION OF THE DRAWINGS

For the purpose of illustrating the invention, the drawings show a form of the invention that is presently preferred. However, it should be understood that the present invention is not limited to the precise arrangements and instrumentalities shown in the drawings, wherein.

DETAILED DESCRIPTION OF THE INVENTION

Figure 1:
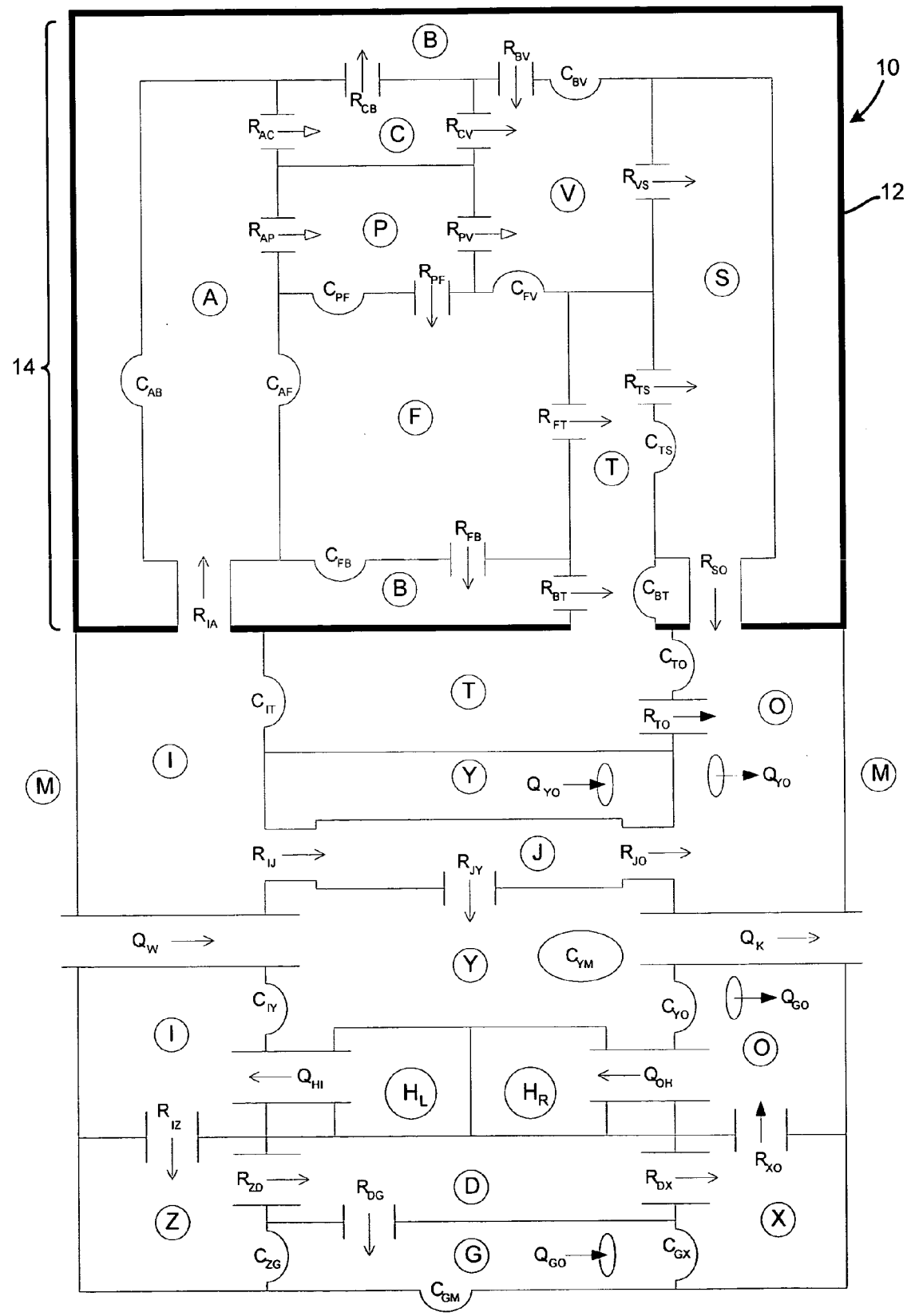
FIG. 1 is a simplified schematic of one embodiment of a multi-compartmental model for determining intracranial pressure dynamics.

The present invention is directed to a whole-body mathematical model for simulating intracranial pressure dynamics. Examples of the disclosed invention are depicted in FIGS. 1–11, although it should be understood that the present invention is not limited to this (or any other) particular embodiment, but rather is intended to cover models and systems that fairly fall within the broad scope of the appended claims.

As described in U.S. Provisional Patent Serial No. 60/409,551, which is incorporated by reference as if disclosed herein in its entirety, the model of the present invention revokes the Kellie-Monro Doctrine by consistently embedding the intracranial system within whole-body physiology. In one embodiment, the model of the present invention includes 17 interacting compartments, of which nine lie entirely outside of the intracranial vault. Two distinct compartments are defined to distinguish ventricular from extra-ventricular CSF. The vasculature of the intracranial system within the cranial vault is also subdivided into five compartments representing fluid in the intracranial arteries, capillaries, choroid plexus, veins, and venous sinus. The body's extracranial systemic vasculature is divided into six compartments representing the arteries, capillaries, and veins of the central body and the lower body. Tissue and the associated interstitial fluid in the intracranial and lower regions are divided into two compartments. A composite compartment involving the tissues, organs, and pulmonary circulation of the central body and an implicit compartment representing the external environment complete the model. Since the time-dependent compartmental pressure functions are obtained from physical pressures through a "lumping" procedure that involves space-averaging over the physical extent of a compartment, the subdivision of physical constituents into distinct spatially limited compartments is necessary to provide spatial resolution in this modeling approach.

In addition to allowing direct flows (e.g. arteries to capillaries to veins) between adjacent compartments, the present work includes the extracranial transfer of fluid between capillaries and tissue by filtration. An extracranial lymphatic system is also included in the model. Components of the model allow regulation of systemic vascular pressures by the sympathetic nervous system, and, at less than extreme (high or low) pressures, autoregulation mechanisms provide constant blood flow to the cerebrovascular capillaries and the choroid plexus as well as constant production of CSF in the choroid plexus. Fluid intake, renal output of fluid, and adjustment of body volume in response to changes in ambient environmental pressure are allowed. A realistic representation for cardiac uptake and cardiac output provides the forcing for this system.

The form of the present model is a system of governing differential equations for the fully time-dependent compartmental pressure functions. A component of the present work is determining appropriate forms for the non-constant resistance and compliance parameters in the model, which may be functions of both pressures and time. Calibration of physically realistic scale values for parameters and flows is also a step in the simulation process.

Turning to the drawings, wherein like reference numerals refer to like elements, FIG. 1 illustrates one embodiment of a mathematical model 10 according to the present invention. In mathematical model 10, the human body is divided into 16 distinct compartments, lettered A, B, C, D, F, G, I, J, O, P, S, T, V, X, Y, and Z. Compartment A represents the intracranial arteries. Compartment B represents the brain. Compartment C represents the intracranial capillaries. Compartment D represents the lower capillaries. Compartment F represents the ventricular CSF. Compartment G represents the lower tissue. Compartment I represents the central arteries. Compartment J represents the central capillaries. Compartment O represents the central veins. Compartment P represents the choroid plexus capillaries. Compartment S represents the venous sinus jugular veins. Compartment T represents the extra-ventricular CSF. Compartment V represents the intracranial veins. Compartment X represents the lower veins. Compartment Y represents the rest of the body. Compartment Z represents the lower arteries. Compartment M represents the external atmosphere. Compartment $H_L$ and $H_R$ represent the left and right heart chambers. The physical constituents in subunits of the present model are blood, CSF, and tissue and interstitial fluid. With a single exception, i.e., compartment Y, each compartment is composed of a single constituent. Spatial resolution is obtained by first dividing the body into intracranial and extracranial components. To help delineate the intracranial system, a thick line 12 in FIG. 1 represents a cranial vault 14, which differentiates intracranial from extra-cranial compartments. Compartments I, Z, Y, J, D, G, O, and X lie completely outside of cranial vault 14, and compartment T includes both intracranial and extracranial physiology.

Figure 2:
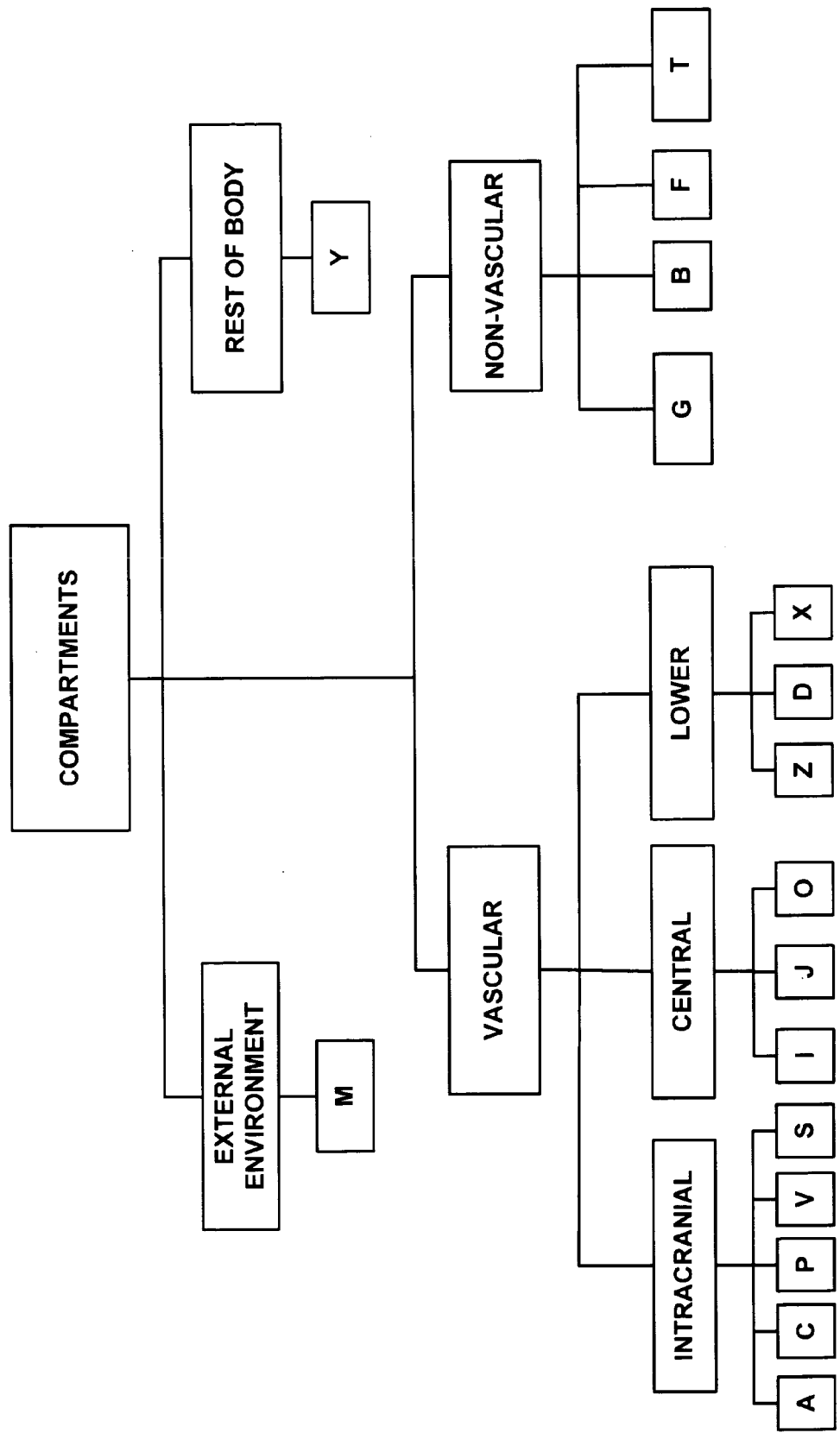
FIG. 2 is a block diagram of the various compartments of a model according to FIG. 1.

As illustrated in FIG. 2, the majority of the compartments in the current model are vascular. The 11 vascular compartments can be subdivided spatially into three groups: intracranial compartments A, C, P, V, and S; central compartments I, J, and O, and lower compartments Z, D, and X. The "lower" compartments represent the region below the pelvis. The "central" compartments in the model represent the region between the lower body and the clavicles and also include extracranial body components above the clavicles but outside of the cranial wall. The vascular system in each of these three regions, i.e., intracranial, central, and lower, is divided into separate artery, capillary, and vein compartments. However, in the intracranial space, the choroid plexus capillaries are placed in a separate compartment P from the rest of the intracranial capillary bed. This allows these capillaries to autoregulate to maintain the production of CSF when ventricular CSF pressures rise or fall. The venus-sinus veins where CSF absorption occurs through the arachnoid villa and the jugular veins are also placed in a compartment separate from the remainder of the intracranial veins, i.e., compartment S. There are four strictly non-vascular model subunits. Two of these compartments represent tissue matter and interstitial fluid, i.e., lower compartment G and brain compartment B, and the other two represent CSF compartments, i.e., ventricular F and extra-ventricular T. Compartment T is both an intracranial and a central compartment. Compartment T, which contains extra-ventricular CSF and lies partially outside of the cranial vault, includes both the subarachnoid and spinal portions of CSF space. Compartment T serves as a bridging compartment and explicitly allows for buffering of CSF pressures by the spinal theca. Two of the three regions contain a separate compartment for the tissue and interstitial fluid. The exception is the central region where the tissue matter, organs (except for the heart), interstitial fluid and pulmonary circulation are lumped into a composite rest-of-body compartment Y. The central region contains an explicit representation for the heart pump having a left chamber pump $H_L$, and a right chamber pump $H_R$, and a realistic pulsatile cardiac output provides the major forcing in the current model.

External environment compartment M is also an implicit 17-th subunit in the model. No attempt has been made to depict relative volumes in FIG. 1, and hence the relative sizes of these compartments in the figure do not reflect relative volumes.

The pressure dynamics of the intracranial system are governed by a system of differential equations within mathematical model 10. Four basic assumptions lead to these equations:

(1) all fluids are considered incompressible and isothermal;

(2) pressure driven flows are laminar and related to pressure differences by $$Q_{ij} = \frac{P_i - P_j}{R_{ij}} = Z_{ij}(P_i - P_j) = Z_{ij}P_{ij}, \quad (1)$$

where $Q_{ij}$ is the flow from compartment i into compartment j, $P_i$ and $P_j$ are the spatially-averaged pressures of compartments i and j respectively, $R_{ij}$ is the lumped resistance, $Z_{ij}$ is the fluidity (inverse of $R_{ij}$), the pressure difference $P_{ij}=P_i-P_j$, and $R_{ij}=-R_{ji}$;

(3) in the case of fluid filtration from the capillaries into the interstitial space, the flow is governed by the Starling-Landis Equation, i.e., $$\text{Filtration}=K_{ct}((P_c-P_t)-\sigma_{ct}(\pi_c-\pi_t))=K_{ct}(P_{ct}-\sigma_{ct}\pi_{ct}), \quad (2)$$

where $P_c$ is the capillary pressure, $P_t$ is the interstitial fluid pressure, $\pi_c$ is the blood plasma colloid osmotic pressure, $\pi_t$ is the interstitial fluid colloid osmotic pressure, $K_{ct}$ is the filtration coefficient, and $\sigma_{ct}$ is the capillary membrane reflection coefficient. The notation for pressure difference has been extended to osmotic pressure differences by defining $\pi_{ct}=\pi_c-\pi_t$; and (4) the deformation of the membrane between adjacent compartments is a function of the change in pressure difference between these compartments, i.e., $$\frac{dV_{ij}}{dt} = C_{ij}\frac{d(P_i - P_j)}{dt} = C_{ij}\frac{d(P_{ij})}{dt} \quad (3)$$

where $V_{ij}$ denotes the instantaneous volume of the 'cup' formed in the membrane at the interface of compartments i and j, $C_{ij}$ denotes the compliance between these two compartments, and $C_{ij}=C_{ji}$.

Figure 3:
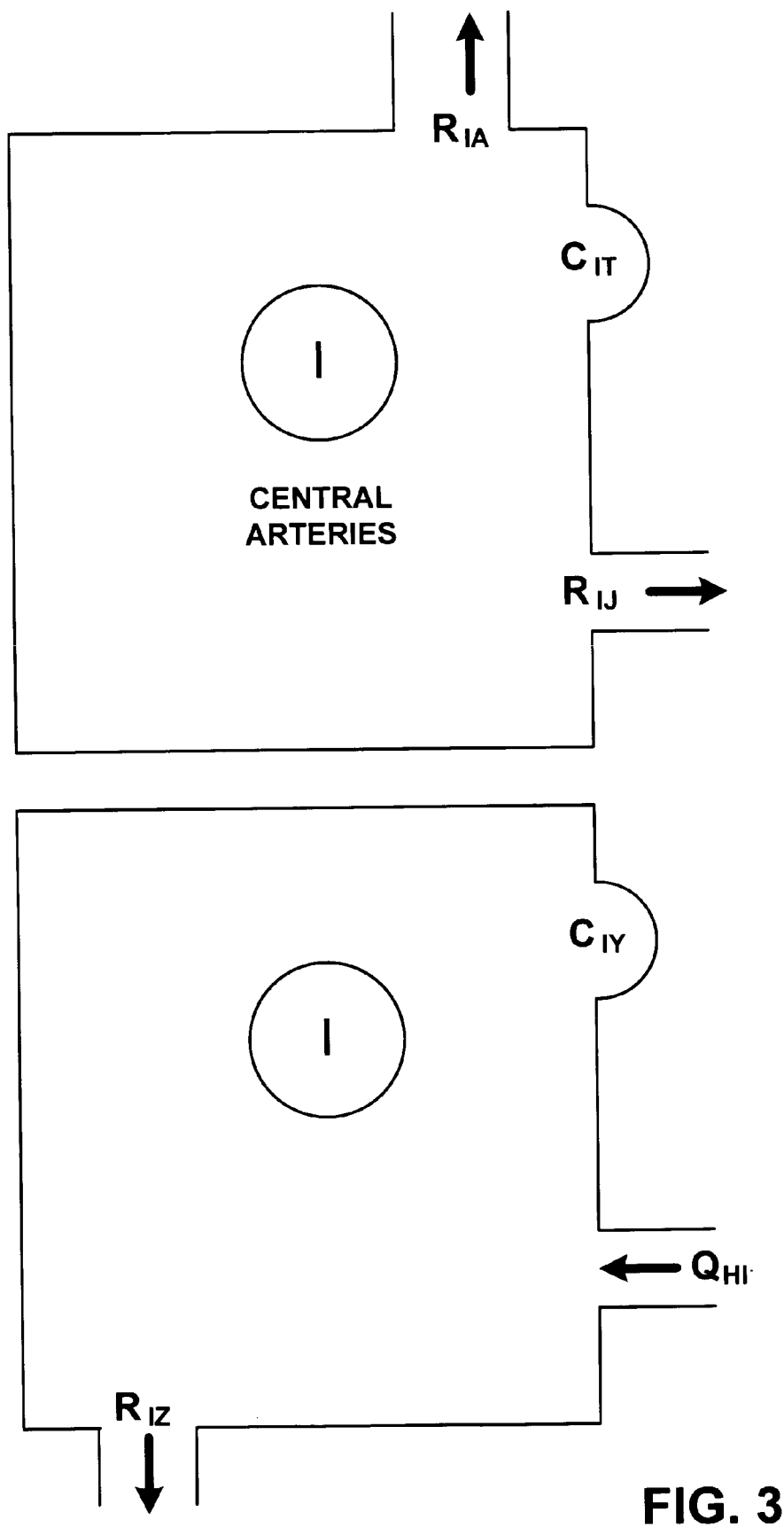
FIG. 3 is the intracranial arteries compartment of the model according to FIG. 1.

As follows, the system of governing equations is obtained by invoking the conservation law flow rate in−flow rate out=rate of volume change (4)

in each compartment. Referring now to FIG. 3, compartment I from FIG. 1 is illustrated. Compartment I represents the central arteries. The flow rate into compartment I is represented by $Q_{HI}$ from left heart chamber pump $H_L$. The flow rate out of compartment I is the sum of the flows associated with lumped resistances $R_{IA}$, $R_{IJ}$, and $R_{IZ}$, as represented by equation (1). The rate of volume change of compartment I is equal to the sum of the terms associated with the compliances $C_{IT}$ and $C_{IY}$, as represented by equation (3).

Specifically, the pressure dynamics of compartment I are governed by the following equation:

$$Q_{HI} - (Z_{IJ}P_{IJ} + Z_{IZ}P_{IZ} + Z_{IA}P_{IA}) = C_{IT}\frac{dP_{IT}}{dt} - \frac{dV_{YI}}{dt}. \quad (5)$$

Note that in equation (5), the subscript "IY" has been reversed thereby causing the associated term to be negative. Also, in both FIGS. 1 and 3, a filled arrow indicates a one-way flow and a hollow arrow indicates a pressure dependent resistance. In terms of pressure differences, the relation of equation (4) yields the following additional 12 differential equations and three scalar equations for the remaining 15 body compartments:

Central Capillary Compartment (J):

$$Z_{IJ}P_{IJ}-(K_{JY}(P_{JY}-\sigma_{JY}\pi_{JY})+Z_{JO}P_{JO})=0; \quad (6)$$

Rest of Body Compartment (Y):

$$Q_W + K_{JY}(P_{JY} - \sigma_{JY}\pi_{JY}) - (Q_{YO} + Q_K) = \quad (7)$$
$$C_{YM}\frac{dP_{YM}}{dt} + \frac{dV_{YI}}{dt} + \frac{dV_{YO}}{dt};$$

Central Venous Compartment (O):

$$Z_{JO}P_{JO} + Z_{XO}P_{XO} + Z_{SO}P_{SO} + Z_{TO}P_{TO} + Q_{GO} + Q_{YO} - Q_{OH} = \quad (8)$$
$$C_{TO}\frac{dP_{OT}}{dt} - \frac{dV_{YO}}{dt};$$

Lower Artery Compartment (Z):

$$Z_{IZ}P_{IZ} - Z_{ZD}P_{ZD} = C_{ZG}\frac{dP_{ZG}}{dt}; \quad (9)$$

Lower Capillary Compartment (D):

$$Z_{ZD}P_{ZD}-(Z_{DX}P_{DX}+K_{DG}(P_{DG}-\sigma_{DG}\pi_{DG}))=0; \quad (10)$$

Lower Tissue Compartment (G):

$$K_{DG}(P_{DG} - \sigma_{DG}\pi_{DG}) - Q_{GO} = \quad (11)$$
$$C_{ZG}\frac{dP_{GZ}}{dt} + C_{GX}\frac{dP_{GX}}{dt} + C_{GM}\frac{dP_{GM}}{dt};$$

Lower Venous Compartment (X):

$$Z_{DX}P_{DX} - Z_{XO}P_{XO} = C_{GX}\frac{dP_{XG}}{dt}; \quad (12)$$

Intracranial Artery Compartment (A):

$$Z_{IA}P_{IA} - (Z_{AC}P_{AC} + Z_{AP}P_{AP}) = C_{AB}\frac{dP_{AB}}{dt} + C_{AF}\frac{dP_{AF}}{dt}; \quad (13)$$

Intracranial Capillary Compartment (C):

$$Z_{AC}P_{AC}-(Z_{CB}P_{CB}+Z_{CV}P_{CV})=0; \quad (14)$$

Choroid Plexus Compartment (P):

$$Z_{AP}P_{AP} - (Z_{PF}P_{PF} + Z_{PV}P_{PV}) = C_{PF}\frac{dP_{PF}}{dt}; \quad (15)$$

Intracranial Veins Compartment (V):

$$Z_{CV}P_{CV} + Z_{PV}P_{PV} + Z_{BV}P_{BV} - Z_{VS}P_{VS} = \quad (16)$$
$$C_{BV}\frac{dP_{VB}}{dt} + C_{FV}\frac{dP_{VF}}{dt};$$

Venous Sinus—Jugular Veins Compartment (S):

$$Z_{VS}P_{VS} + Z_{TS}P_{TS} - Z_{SO}P_{SO} = C_{TS}\frac{dP_{ST}}{dt}; \quad (17)$$

Ventricular CSF Compartment (F):

$$Z_{PF}P_{PF} - (Z_{FB}P_{FB} + Z_{FT}P_{FT}) = \quad (18)$$
$$C_{AF}\frac{dP_{FA}}{dt} + C_{PF}\frac{dP_{FP}}{dt} + C_{FB}\frac{dP_{FB}}{dt} + C_{FV}\frac{dP_{FV}}{dt};$$

Extra-Ventricular CSF Compartment (T):

$$Z_{FT}P_{FT} + Z_{BT}P_{BT} - (Z_{TS}P_{TS} + Z_{TO}P_{TO}) = \quad (19)$$
$$C_{TS}\frac{dP_{TS}}{dt} + C_{BT}\frac{dP_{TB}}{dt} + C_{TO}\frac{dP_{TO}}{dt} + C_{IT}\frac{dP_{TI}}{dt}; \text{ and}$$

Brain Compartment (B):

$$Z_{CB}P_{CB} + Z_{FB}P_{FB} - (Z_{BV}P_{BV} + Z_{BT}P_{BT}) = \quad (20)$$
$$C_{AB}\frac{dP_{BA}}{dt} + C_{BV}\frac{dP_{BV}}{dt} + C_{FB}\frac{dP_{BF}}{dt} + C_{BT}\frac{dP_{BT}}{dt}.$$

The terms $dV_{YI}/dt$ and $dV_{YO}/dt$ in the conservation equations for compartments Y, I, and O have been left intact in equations (5), (7), and (8). These volume changes include components that reflect the regulation of arterial pressure by the sympathetic nervous system. They are considered further below. The terms involving $dP_M/dt$ in the conservation equations for 6 compartments Y, and G (equations (7) and (11)) denote a volume change for which there is no compensation through an equal but opposite volume change in an adjacent body compartment. Specifically, these terms reflect volume increases (or decreases) into the ambient environment, which is considered infinitely large and unaffected by pressure changes within the body. Ambient environment compartment M is similar to the ground in an electrical circuit model. It will be maintained at a constant pressure value in exactly the same way that the ground voltage in a circuit model is given a prescribed value relative to which all other values are gauged. Accordingly, the ambient environmental pressure $P_M$ is fixed here at a constant reference value of zero mmHg. If this is not appropriate for a situation being studied, or if the ambient pressure changes with time, then $P_M$ must be considered as a forcing term in the system of equations.

The set of governing equations may be summed to derive the following constraint regarding compliances between the body and the external environment:

$$(Q_W - Q_K) + (Q_{HI} - Q_{OH}) = C_{YM}\frac{dP_{YM}}{dt} + C_{GM}\frac{dP_{GM}}{dt}. \quad (21)$$

If cardiac output equals cardiac uptake ($Q_{HI}=Q_{OH}$) and the atmospheric pressure is constant, equation (21) simplifies to $$Q_W - Q_K = C_{YM}\frac{dP_Y}{dt} + C_{GM}\frac{dP_G}{dt}. \quad (22)$$

If, in addition, $Q_W=Q_K=0$ or fluid intake equals fluid discharge ($Q_W=Q_K$), then equation (22) implies as expected that the net volume change of the entire body system must be zero. Furthermore, if $Q_W>Q_K$, as will initially be the case when a glass of water is consumed, the net volume of the body will increase. By equation (22), one of the internal compartmental pressures: $P_G$, or most likely $P_Y$, must now increase. However, if as will be the case, $C_{YM}$ is large, the resultant pressure increase in compartment Y due to the volume input from the ambient environment will be small.

The fluidities in equation (1) must be derived, the filtration and reflection coefficients in equation (2) must be calibrated, and the compliances in equation (3) must be calibrated before model 10's governing differential equations may be used in simulations.

Each constant fluidity $Z_{ij}$ between arbitrary adjacent compartments i and j may be calculated by substituting the mean pressures and the mean flow rates into equation (1) and solving for $Z_{ij}$, giving $$Z_{ij} = \frac{\overline{Q}_{ij}}{\overline{P}_i - \overline{P}_j}. \quad (23)$$

Therefore, once the mean flows and pressures are estimated from physical data, the associated constant fluidities may be calculated from equation (23). Some model fluidities are pressure dependent. A discussion of appropriate expressions for pressure dependent is provided below where CSF, cerebrovascular, sympathetic nervous system, and cardiac autoregulation mechanisms are modeled. However, even for a non-constant fluidity, a mean scale value may still be calculated from equation (23). In the calibrations that follow, mean flows and pressures reflect physiological values for an average human in a lying down (supine) position.

To estimate mean flows, it will be assumed that compartmental volumes remain constant in the mean state. Compartmental pressures are certainly pulsatile, so the system will have a mean state, but not a steady state. However, since volume changes are related to pressure differences between adjacent compartments, if pressures in adjacent compartments move in tandem in the mean state, volumes will remain unchanged. Therefore, for a given compartment, if all but one of the mean flows are known, the final mean flow may be determined from maintaining constant volume. Further, once mean flows into and out of a given compartment are determined, these values provide data for flows in the adjacent compartments. While many flows can be estimated from data available in published literature, most mean flow calibrations must make use of the constant volume assumption.

As a starting point for the calibration of mean flows, consider the percentages of cardiac output $Q_{HI}$ that exit the central arteries into the three peripheral artery systems: A, I, or Z. These percentages, in decimal form, are given below.

$$p_{ia}=0.15, = \% \text{ of cardiac output into intracranial region} \tag{24}$$

$$p_{iz}=0.25, 0.35, = \% \text{ of cardiac output into lower region} \tag{25}$$

$$p_{ij}=1-(p_{ia}+p_{iz}), = \% \text{ of cardiac output into rest of body} \tag{26}$$

Additional helpful percentages and ratios include $$p_{pf}=0.70, = \% \text{ of CSF formation from the choroid plexus} \tag{27}$$

$$\lambda=250, \overline{Q}_{AC}/\overline{Q}_{AP} \tag{28}$$

$$p_{ts}=0.80, = \% \text{ of CSF drained into venous sinus} \tag{29}$$

Literature values give the following mean flows in ml/min:

$$\overline{Q}_{HI}=5000, 6600, 6900, \text{ Cardiac output} \tag{30}$$

$$\overline{Q}_{CF}=2, \text{ Total capillary filtration (with 2/3 from liver and intestines)} \tag{31}$$

$$\overline{Q}_{JY} = \overline{Q}_{CF}\left(\frac{2}{3} + \frac{1}{3}\frac{p_{ij}}{p_{ij}+p_{iz}}\right), \text{ Total capillary filtration into central tissue} \tag{32}$$

$$\overline{Q}_{DG} = \frac{1}{3}\frac{p_{iz}}{p_{ij}+p_{iz}}\overline{Q}_{CF}, \text{ Total capillary filtration into lower tissue} \tag{33}$$

$$\overline{Q}_F=0.35, \text{ Total CSF formation} \tag{34}$$

$$Q_{BV}=0.001, \text{ Imbalance of diffusion on venule side of cerebrovasculature} \tag{35}$$

$$\overline{Q}_{FB}=0.044, \text{ Flow of CSF through the Virkow-Robins Space} \tag{36}$$

All of the remaining mean flows in the model may now be calibrated based on equations (24) through (36) by invoking the constant volume assumption in each compartment during the mean state. The calibration procedure yields the mean flows:

Central Body Mean Flows $$\overline{Q}_{OH}=\overline{Q}_{HI} \text{ from cardiac output=cardiac input} \tag{37}$$

$$\overline{Q}_{IA}=P_{ia}\overline{Q}_{HI} \text{ from equation (24)} \tag{38}$$

$$\overline{Q}_{IZ}=P_{iz}\overline{Q}_{HI} \text{ from equation (25)} \tag{39}$$

$$\overline{Q}_{IJ}=\overline{Q}_{HI}-(\overline{Q}_{IA}+\overline{Q}_{IZ}) \text{ from constant volume in } I \tag{40}$$

$$\overline{Q}_{JO}=\overline{Q}_{IJ}-\overline{Q}_{JY} \text{ from constant volume in } J \tag{41}$$

$$\overline{Q}_{YO}=\overline{Q}_{JY} \text{ from constant volume in } Y \tag{42}$$

Lower Body Mean Flows $$\overline{Q}_{ZD}=\overline{Q}_{IZ} \text{ from constant volume in } Z \tag{43}$$

$$\overline{Q}_{GO}=\overline{Q}_{DG} \text{ from constant volume in } G \tag{44}$$

$$\overline{Q}_{DX}=\overline{Q}_{ZD}-\overline{Q}_{DG} \text{ from constant volume in } D \tag{45}$$

$$\overline{Q}_{XO}=\overline{Q}_{DX} \text{ from constant volume in } X \tag{46}$$

Intracranial Mean Flows $$\overline{Q}_{AP}=\overline{Q}_{IA}/(\lambda+1) \text{ from constant volume in A and equation (28)} \tag{47}$$

$$\overline{Q}_{AC}=\lambda\overline{Q}_{AP} \text{ from equation (28)} \tag{48}$$

$$\overline{Q}_{PF}=p_{pf}\overline{Q}_F \text{ from equation (27)} \tag{49}$$

$$\overline{Q}_{CB}=(1-p_{pf})\overline{Q}_F+\overline{Q}_{BV} \text{ from } \overline{Q}_{CB}-\overline{Q}_{BV}=(1-p_{pf})\overline{Q}_F \tag{50}$$

$$\overline{Q}_{CV}=\overline{Q}_{AC}-\overline{Q}_{CB} \text{ from constant volume in } C \tag{51}$$

$$\overline{Q}_{PV}=\overline{Q}_{AP}-\overline{Q}_{PF} \text{ from constant volume in } P \tag{52}$$

$$\overline{Q}_{VS}=\overline{Q}_{CV}+\overline{Q}_{PV}+\overline{Q}_{BV} \text{ from constant volume in } V \tag{53}$$

$$\overline{Q}_{BT}=\overline{Q}_{CB}+\overline{Q}_{FB}-\overline{Q}_{BV} \text{ from constant volume in } B \tag{54}$$

$$\overline{Q}_{FT}=\overline{Q}_{PF}-\overline{Q}_{FB} \text{ from constant volume in } F \tag{55}$$

$$\overline{Q}_{TS}=p_{ts}\overline{Q}_F \text{ from equation (29)} \tag{56}$$

$$\overline{Q}_{TO}(1-p_{ts})\overline{Q}_F \text{ from constant volume in } T \tag{57}$$

$$\overline{Q}_{SO}=\overline{Q}_{VS}+\overline{Q}TS \text{ from constant volume in } S \tag{58}$$

Equation (49) states that 70% of the CSF formation comes from the choroid plexus and equation (50) states that the remaining CSF formation comes as a filtrate from the 10 capillaries through the brain via the Virchow-Robins system minus the amount reabsorbed at the venule side of the capillaries ($Q_{BV}$). Notice that, as should be the case, $$\overline{Q}_{BT}+\overline{Q}_{FT}=\overline{Q}_F.$$

In addition to allowing direct flows (e.g. arteries to capillaries to veins) between adjacent compartments, the present model includes the transfer of fluid between capillaries and tissue by filtration. These flows are governed by the Starling-Landis equation and are driven by differences between the colloid osmotic pressures of the blood plasma in the capillaries and the interstitial fluid as well as by the usual compartmental pressure differences between capillaries and tissue. Filtration mechanisms are included between the capillaries and tissue compartments in the central and lower portions of the body in the present model. In the intracranial region, significant colloid osmotic pressure differences do occur between the intracranial capillary and tissues. However, the endothelial cells that make up the intracranial capillary wall are so tightly joined that not even water molecules can usually pass between them. Thus, under normal conditions, colloid osmotic pressure forces in the intracranial region are irrelevant. In the case of highly elevated capillary pressure it is possible for the intracranial capillary wall to expand enough to allow water molecules to pass between the endothelial cells, and at this point both colloid osmotic pressures and regular pressures start governing filtration rates. At these elevated pressures, the description of intracranial capillary filtration as a function of capillary pressure will clearly be nonlinear. However, to simplify the equation for intracranial filtration, this relationship may still be linearly approximated with the slope defined by $Z_{CB}$, $Z_{BV}$, and $Z_{FB}$.

There are two locations in the model where fluid flow is governed by the Starling-Landis equation (2). These flows in the central and lower body are $$Q_{JY}=K_{JY}((P_J-P_Y)-\sigma_{JY}(\pi_J-\pi_Y)) \text{ and} \tag{59}$$

$$Q_{DG}=K_{DG}((P_D-P_G)-\sigma_{DG}(\pi_D-\pi_G)), \tag{60}$$

denoting the flow from the capillaries into the tissue subunits of the central and lower body regions, respectively. Solving these relations for the filtration coefficients in the mean state implies $$K_{JY} = \frac{\overline{Q}_{JY}}{((\overline{P}_J - \overline{P}_Y) - \sigma_{JY}(\overline{\pi}_J - \overline{\pi}_Y))} \tag{61}$$

$$K_{DG} = \frac{\overline{Q}_{DG}}{((\overline{P}_D - \overline{P}_G) - \sigma_{DG}(\overline{\pi}_D - \overline{\pi}_G))} \tag{62}$$

The mean flows on the right hand side of these equations have been calculated above. Thus, to determine the filtration coefficients $K_{JY}$ and $K_{DG}$, it is only necessary to calibrate scale values for the mean colloid osmotic pressures and the reflection coefficients.

Mean interstitial fluid colloid osmotic pressure is given by $$\overline{\pi}_Y=\overline{\pi}_G=8 \text{ mmHg} \tag{63}$$

and blood plasma colloid osmotic pressure by $$\overline{\pi}_J=\overline{\pi}_D=28 \text{ mmHg.} \tag{64}$$

Notice that these values are invariant with respect to central or lower regions. This is not the case, however, with the reflection coefficients $\sigma_{JY}$ and $\sigma_{DG}$. The reflection coefficient 11 in the legs is estimated to be approximately 0.9 while the coefficient of the upper body is less than this value. This is reflected by the assignments $$\sigma_{JY}=0.8 \tag{65}$$

$$\sigma_{DG}=0.9 \tag{66}$$

The filtration coefficients $K_{JY}$ and $K_{DG}$ in equations (61) and (62) are now readily determined.

Calibration of scale values for all resistance and compliance parameters from available physical data and other relationships must be accomplished before the model's governing differential equations can be used in simulations. A key step in calibrating model compliances is determining the distensibilities of the extracranial compartments of the model. In particular, each extracranial compartment has an associated total compliance equal to the product of its associated volume and distensibility. It should be noted that calculating compliances by this technique yields a total central artery compliance $C_I=1.529$ ml/mmHg, which is within 5 percent of the data value of 1.445 ml/mmHg for total arterial compliance measured in the ascending aorta by Chemla et al. The central venous compliance calculated by these methods yields $C_V=50$ ml/mmHg while known systemic venous pressure volume curves suggests a total venous compliance of 50 ml/mmHg. Finally, Noordergraaf states that the systemic arterial compliance is between 1 and 2 ml/mmHg and systemic venous is between 50 and 200 ml/mmHg.

In this section, the various compliances in equation (3) that relate volume adjustments to pressure differences will be calculated. In the intracranial region, compartmental volume increases are restricted by the rigid cranial wall. Consequently, compartmental compliances must be pressure dependent and diminish to zero as pressure differences become large. On the other hand, in extracranial regions, to lowest order compliances may consistently be considered constant, approximating a linear relationship between pressure differences and volume adjustments. The present intracranial pressure-dependent compliances are extensions of those derived in the prior art, while the constant extra-cranial compliances will be derived from estimations of the volume and distensibility of each compartment.

In a simplified four-compartment whole-body model for CSF dynamics described in the prior art, there are only two pressure difference dependent compliances. They allow volume adjustments between the CSF and arterial blood and between the CSF and venous blood. These compliances have the general form described by the relation $$C_{ij}^4(P_{ij}) = C_{ij}^o e^{-r_{ij}|P_{ij}|\alpha_{ij}}, \tag{67}$$

where $P_{ij}=P_i-P_j$, and the subscripts i and j take the values $C_{af}^4$ (for arterial/CSF compliance) and $C_{fv}^4$ (for CSF/venous compliance). For both pairs of index values, Coefficients and parameters in equation (67) are given by $$C_{fv}^0=6.5333, r_{fv}=0.633431, a_{fv}=0.604229 \tag{68}$$

$$C_{af}^0=1.82745, r_{af}=0.817102, a_{af}=0.869393 \tag{69}$$

This four-compartment model contains an additional constant compliance between the CSF and the rest of the body (g), which is approximated as $$C_{fg}^4=0.13333. \tag{70}$$

This feature represents the interface of extra-cranial CSF in the spinal theca with the rest of the body. It also acts as a background compliance so that the total CSF compliance can never reach machine zero in simulations.

In the present 16 compartment model, the division of the body's cerebrospinalfluid (CSF) space is considerably more refined. Hence, the three CSF compliances in the simple four compartment model of the prior art must be appropriately apportioned among the compliances of the present model. Three decimal percentages may be introduced to describe this allocation of $C_{fv}^4$:

$$p_{fv}32\ 0.164 \text{ percentage of } C_{fv}^4 \text{ allocated to } C_{FV} \tag{71}$$

$$p_{to}=0.214 \text{ percentage of } C_{fv}^4 \text{ allocated to } C_{TO} \tag{72}$$

$$p_{ts}=0.622 \text{ percentage of } C_{fv}^4 \text{ allocated to } C_{TS} \tag{73}$$

Equations (71–73) reflect the fact that total CSF volume is approximately 140 ml, 23 of which is found in the ventricles, 30 in the spinal cord subarachnoid space (theca) and the remainder in the cerebral cisterns and subarachnoid space. Thus, if the distensibility of the membrane is similar in these three different components of CSF, then $C_{fv}$ is $23/140=0.164$ of $C_{fv}^4$ as indicated by $p_{fv}$ in equation (71). This same technique yields the values in equations (72) and (73). The compliance $C_{PF}$ is excluded in this division of $C_{fv}^4$ as the choroid plexus capillaries are known to dilate and constrict in order to maintain a constant pressure difference between these capillaries and ventricular CSF. This maintains a constant generation rate of CSF from the choroid plexus at normal pressure values. Consequently, a value for the compliance $C_{PF}$ is irrelevant in the absence of a pressure difference change.

The ratios that lead to equations (71)–(73) also imply the following percentages describing the allocation of $C_{af}^4$:

$$p_{af}=0.786 \text{ percentage of } C_{af}^4 \text{ allocated to } C_{AF} \quad (74)$$

$$p_{it}=0.214 \text{ percentage of } C_{af}^4 \text{ allocated to } C_{IT} \quad (75)$$

The background compliance $C^{fg4}$ is now divided between venous and arterial interfaces based on systemic venous volume being four times that of arterial volume, giving $$C_{venous}=0.8 \; C_{fg}^4 \quad (76)$$

$$C_{arterial}=0.2 \; C_{fg}^4 \quad (77)$$

The CSF-related compliances may now be calculated based on the above percentages as:

$$C_{FV}(P_{FV})=0.95 p_{fv}(C_{fv}^4(P_{FV})+C_{venous}) \; \overline{C}_{FV}=0.557868 \; \text{ml/mmHg}$$

$$C_{FB}(P_{FB})=0.05 p_{fv}(C_{fv}^4(P_{FB})+C_{venous}) \; \overline{C}_{FB}=0.036255 \; \text{ml/mmHg}$$

$$C_{TS}(P_{TS})=0.95 \; p_{ts}(C_{fv}^4(P_{TS})+C_{venous}) \; \overline{C}_{TS}=1.27626 \; \text{ml/mmHg}$$

$$C_{BT}(P_{BT})=0.05 \; p_{ts}(C_{fv}^4(P_{BT})+C_{venous}) \; \overline{C}_{BT}=0.137057 \; \text{ml/mmHg}$$

$$C_{TO}(P_{TO})=P_{to}(C_{fv}^4(P_{TO})+C_{venous}) \; \overline{C}_{TO}=0.200936 \; \text{ml/mmHg}$$

$$C_{AF}(P_{AF})=p_{af}(C_{af}^4(P_{AF})+C_{arterial}) \; \overline{C}_{AF}=0.0261999 \; \text{ml/mmHg}$$

$$C_{IT}(P_{IT})=p^{it}(C_{af}^4(P_{IT})+C_{arterial}) \; \overline{C}_{IT}=0.00571427 \; \text{ml/mmHg}$$

where again, the pressure difference $P_i-P_j$ is denoted $P_{ij}$ and the scale value $\overline{C}_{ij}=C_{ij}(\overline{P}_i-\overline{P}_j)=C_{ij}(\overline{P}_{ij})$. The compliance $C_{BT}$, introduced to incorporate volume adjustments between the brain and subarachnoid CSF, is allocated 5% of $C_{TS}$. This states that of the bulk intracranial compliance in compartment T, 95% is allocated to the interface with the highly distensible venous sinus veins and only 5% to the interface with the less distensible brain tissue. A similar allocation is made for the bulk intracranial compliance of the ventricular CSF compartment F with respect to the intracranial veins and the brain tissue.

Finally, brain/vascular compliances $C_{AB}(P_{AB})$ and $C_{BV}(P_{BV})$ are defined by reference 14 to similar CSF/vascular compliances as:

$$C_{AB}(P_{AB})=C_{AF}(P_{AB}) \; \overline{C}_{AB}=0.0209523 \; \text{ml/mmHg}$$

$$C_{BV}(P_{BV})=C_{FV}(P_{BV}) \; \overline{C}_{BV}=0.688845 \; \text{ml/mmHg}.$$

When calculating extra-cranial compliances it is advantageous to first determine the total compliance of each compartment. This quantity will be denoted by $C_i$ with the subscript indicating the compartment. This type of compliance can be described by the relation $$\text{Total Compartmental Compliance} = \frac{\text{Increase in Compartmental Volume}}{\text{Increase in Compartmental Pressure}} \quad (78)$$

and may be experimentally determined by measuring the pressure change that is induced by an estimated volume change and then taking the inverse of this ratio. Unfortunately, clinical data does not exist for determination of all of the compliances required for the current model. However, there is information in the literature regarding volumes and distensibilities. These are related to compliance by $$\text{Compliance} = \text{Distensibility} \cdot \text{Volume}. \quad (79)$$

Therefore, total compartmental compliance may be calculated from total compartmental volume (denoted $V_i$) and compartmental distensibility (denoted $D_i$) through equation (79). However, before calculating compartmental volumes and distensibilities it is useful to describe how the resulting total compartmental compliances will be allocated to the local inter-compartmental compliances.

Estimations of the local compliances are made by requiring that the sum of the relevant local compliances must equal the total compliance being apportioned. With this restriction, the model's predicted compartmental pressure changes induced by known volume changes should agree with experimental data. Based on this principle, the apportionment of total compliances among local compliances is described by Central, Local Compliances:

$$C_{IY}=\text{Max}[C_I-\overline{C}_{IT},0] \; \text{ml/mmHg} \quad (80)$$

$$C_{YO}=\text{Max}[C_O-\overline{C}_{TO},0] \; \text{ml/mmHg} \quad (81)$$

$$C_{YM}=\text{Max}[C_Y-(C_{IY}+C_{YO}),0] \; \text{ml/mmHg} \quad (82)$$

Lower, Local Compliances:

$$C_{ZG}=C_Z \; \text{ml/mmHg} \quad (83)$$

$$C_{GX}=C_X \; \text{ml/mmHg} \quad (84)$$

$$C_{GM}=\text{Max}[C_G-(C_{ZG}+C_{GX}),0] \text{ml/mmHg} \quad (85)$$

Here, the Max function is used to ensure that no negative compliances occur in the model. For the particular choices of total compliances here, this function is not needed, but it is included above as it may be required if total tissue compliances are calculated to be much smaller.

Total blood volume ($V_{blood}$) is estimated at 5000 ml and 5600 ml, where blood plasma makes up about 60% of this. The relative volumes of systemic veins, arteries and capillaries are:

$$V_{sa}=0.16 \; V_{blood} \; \text{systemic artery volume} \quad (86)$$

$$V_{sv}=0.64 \; V_{blood} \; \text{systemic vein volume} \quad (87)$$

$$V_{sc}=0.04 \; V_{blood} \; \text{systemic capillary volume} \quad (88)$$

$$V_{pulm}=0.09 \; V_{blood} \; \text{pulmonary system volume} \quad (89)$$

$$V_{heart}=0.07 \; V_{blood} \; \text{heart-blood volume} \quad (90)$$

These values are based on estimates that the systemic arteries comprise 13% of the blood volume while the systemic arterioles and capillaries comprise 7%. In the present model, arteriole volume is lumped with the arteries, and hence 3% of the arteriole/capillary space is shifted here into the artery compartment resulting in the percentages above. It should also be noted that these percentages imply that systemic venous volume is four times that of systemic artery volume.

As a next step, arterial and venous volumes must be allocated between the intracranial, lower, and central compartments. Estimates for this distribution are given below. It should be emphasized that these are percentages of the systemic blood and exclude the blood volumes in the heart and pulmonary system.

$$pV_{cran}=0.07 \text{ percentage of systemic blood, intracranial region} \quad (91)$$

$$pV_{lower}=0.40 \text{ percentage of systemic blood, lower region} \quad (92)$$

$$pV_{central}=0.53 \text{ percentage of systemic blood, central region} \quad (93)$$

The above percentages lead to the following volumes for the extra-cranial, vascular compartments:

$$V_Z=pV_{lower}V_{sa}=\text{lower artery volume} \quad (94)$$

$$V_I=pV_{central}V_{sa}=\text{central artery volume} \quad (95)$$

$$V_X=pV_{lower}V_{sv}=\text{lower vein volume} \quad (96)$$

$$V_O=pV_{central}V_{sv}=\text{central vein volume} \quad (97)$$

$$V_D=pV_{lower}V_{sc}=\text{lower capillary volume} \quad (98)$$

$$V_J=pV_{central}V_{sc}=\text{central capillary volume.} \quad (99)$$

The volumes of the tissue and rest of body compartments are now calculated based on interstitial fluid volume and intracellular fluid volume. Total interstitial fluid volume is estimated in the prior art to be 12 L, while total intracellular fluid volume is estimated to be 28 L. Considering that approximately 2 L of the intracellular fluid is contained in the blood cells, the following volume assignments can be made:

$$V_{inter}=12000 \text{ ml}=\text{interstitial fluid volume} \quad (100)$$

$$V_{intra}=26000 \text{ ml}=\text{intracellular fluid volume} \quad (101)$$

With these volume assignments and the percentages in equations (92)–(93), estimates for lower tissue and rest-of-body volumes become:

$$V_G=pV_{lower}(V_{inter}+V_{intra})=\text{lower tissue volume} \quad (102)$$

$$V_Y=pV_{central}(V_{inter}+V_{intra})+V_{pulm}=\text{rest of body volume} \quad (103)$$

Estimations for the pressure-strain modulus are given by Milnor and Nichols and O'Rourke for various branches of the systemic arteries. From this data, the distensibility of the various vessels can be calculated. Of interest here are the calculated distensibilities for the ascending aorta and the femoral artery, represented in the model by $D_I$ and $D_Z$. Milnor's data suggests that $D_I$ is 0.0036225 mmHg$^{-1}$ and $D_z$ is 0.00101 mmHg$^{-1}$ while Nichols and O'Rourke data suggests $D_I$ is 0.00320141 mmHg$^{-1}$ and $D_Z$ is 0.00237912 mmHg$^{-1}$.

Averaging these values results in the assignments $$D_I=0.00341196 \quad (104)$$

$$D_Z=0.00169456. \quad (105)$$

Since it is known that the central veins are eight times as distensible as central arteries, $D_O$ is calculated accordingly by $$D_O=8D_I. \quad (106)$$

There are some suggestions in the prior art that the upper venous distensibility may be larger that of the lower leg, but these results are inconclusive. Therefore, lower venous distensibility is set to $$D_X=D_O. \quad (107)$$

Consistent with prior art findings, the capillary compartments C, J, and D are considered non-deformable.

The distensibility of the lower tissue compartment is assigned a weighted average of the interfacing vein and artery distensibilities. Since the veins have four times the volume of the arteries, these weights are used in $$D_G = \frac{D_Z + 4D_X}{5} = 0.0221754 \text{ (ml/mmHg)/ml} \quad (108)$$

Finally, the distensibility of the rest-of-body compartment (Y) is also a weighted average based on its composition:

$$D_Y = \frac{pV_{central}(V_{inter} + V_{intra})D_G + \left(\frac{4}{5}V_{pulm}\right)D_O + \left(\frac{1}{5}V_{pulm}\right)D_I}{V_Y} \quad (109)$$

$$= 0.0221838 \text{ (ml/mmHg)/ml}$$

The distensibilities of the extra-cranial compartments have now been determined. Combined with the volumes of the previous section, each extra-cranial compartment now has an associated total compliance equal to the product of its associated volume and distensibility.

A lymphatic system is also included in the present model. This system allows interstitial fluid in the tissue compartments of the central and lower regions of the body to flow directly into the central venous compartment. Lymphatic flows are thus able to balance filtration in these regions and establish an equilibrium state. Lymphatic flow Is not introduced in the intracranial region as the brain appears to lack lymphatic vessels. However, drainage of interstitial fluid via the Virchow-Robins Spaces is accommodated by pathways between the Brain and CSF compartments.

The lymphatic system is represented in the present model through the flows $Q_{YO}$ and $Q_{GO}$. These flows provide pathways through which interstitial fluid can move directly from the interstitium to the central venous system. Unlike the flows between adjacent compartments, which are driven by pressure differences, the lymphatic flow is governed almost exclusively by the interstitial fluid pressure. This flow increases 20 fold at interstitial fluid pressures near 4 mmHg from the corresponding flow at an interstitial pressure of −6 mmHg. Below this interstitial fluid pressure value, lymphatic flow ceases. The relative lymphatic curve is modeled by the logistic expression $$P_{lymph}(x) = \frac{M}{1 + (M-1)e^{-r(x+6)}}, \text{ where } M = 20 \text{ and } r = 1 \quad (110)$$

Figure 4:
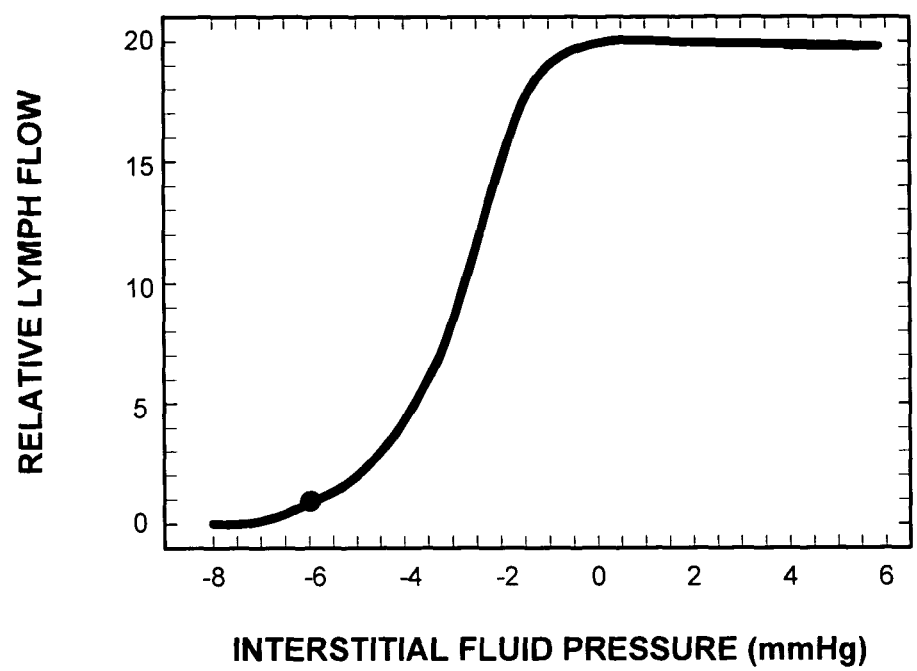
FIG. 4 is a chart of interstitial fluid pressure vs. relative lymph flow.
Figure 5:
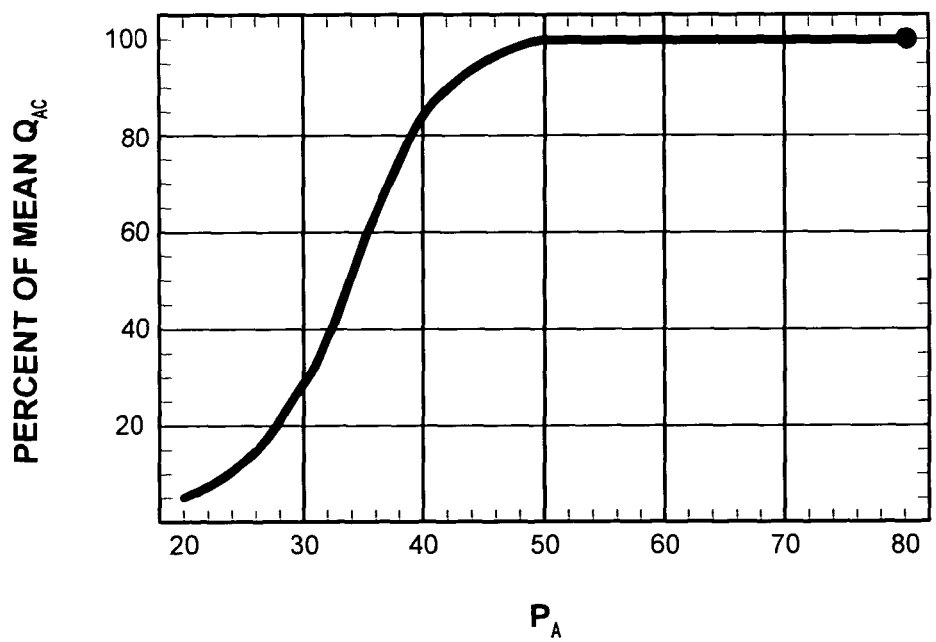
FIG. 5 is a chart of percent reduction in $Q_{AC}$ VS. $P_A$.

This function, depicted in FIG. 4, defines the relative lymph flow in terms of interstitial pressure. The large dot in FIG. 4 denotes the mean pressure of interstitial fluid in the model. Conversion of this relationship to the actual lymphatic flows $Q_{GO}$ and $Q_{YO}$ is accomplished by defining $$Q_{GO}(t) = \frac{P_{lymph}(P_G)\overline{Q}_{GO}}{P_{lymph}(\overline{P}_G)}, \tag{111}$$

$$Q_{YO}(t) = \frac{P_{lymph}(P_Y)\overline{Q}_{YO}}{P_{lymph}(\overline{P}_Y)}. \tag{112}$$

In this manner, the mean flow is maintained at the mean pressure and can increase or decrease accordingly. Based on equation (110), $Q_{GO}$ can increase from a mean flow of about 0.24 ml/min to 4.7 ml/min while $Q_{YO}$ can increase from 1.76 ml/min to 35 ml/min.

Blood supply and CSF production is well regulated in the human intracranial system. This auto-regulation is achieved by the dilation and constriction of the blood vessels induced by factors such as carbon dioxide concentration, hydrogen ion concentration, oxygen concentration and intracranial pressures. The model incorporates such auto-regulation in the form of pressure sensitive fluidities depicting either vessel constriction in the form of a reduced fluidity or dilation in form of increased fluidity.

In all, the present model contains 16 compliance parameters, of which eight are variable and depend on pressure differences. There are also 23 resistance parameters. Four intracranial resistances are pressure-dependent and auto-regulate flow to both the cerebral capillary bed and the choroid plexus as well as the production of CSF in the choroid plexus. CSF production is known to be nearly constant over a wide range of pressures. However, the production 35 of CSF decreases when perfusion pressure decreases to low values, and a mechanism that ramps down CSF production when perfusion pressure falls below 55 mmHg is also included in the model.

Blood flow into the cerebral capillaries is auto-regulated by a pressure dependent fluidity $Z_{AC}$ defined by $$Z_{AC} = \frac{F(P_A)}{P_A - P_C} \tag{113}$$

where $F(P_A)$ is a logistic expression defined by $$F(P_A) = \overline{Q}_{AC} \frac{M}{1 + (M-1)e^{r(\overline{P}_A - P_A)}} \text{ with } M = 1.00001 \text{ and } r = 0.25. \tag{114}$$

This implies that $Q_{AC} = Z_{AC}(P_A - P_C) = F(P_A)$ and cerebral blood flow is thus determined almost entirely by intracranial artery pressure and does not diminish significantly until this pressure drops below 50 mmHg. The relationship between $Q_{AC}$ and $P_A$ is displayed in FIG. 5.

Blood flow into the choroid plexus is regulated by a pressure-difference dependent fluidity $Z_{AP}$ defined by $$Z_{AP} = \frac{\overline{Q}_{AP}}{(P_A - P_P)} \cdot G(P_{perf}) \tag{115}$$

where the multiplier $G(P_{perf})$ in equation (115) is a function of the perfusion pressure $P_{perf} = P_A - P_B$ that is unity when Pperf exceeds 55 mmHg and then falls linearly to zero below this value. This implies that $$Q_{AP} = Z_{AP} \cdot (P_A - P_P) = \overline{Q}_{AP} \cdot G(P_{perf}). \tag{116}$$

The multiplier G has been included in equation (115) to model the fact that CSF production in the choroid plexus scales with blood flow, remains nearly constant over a wide range of pressures, and is decreased as a function of the magnitude of the perfusion pressure when $P_{perf}$ falls 20 below 50 to 60 mmHg. From equation (116), blood flow into the choroid plexus remains constant unless perfusion pressure falls to a low level.

Over the wide range of normal pressures, the production of CSF is auto-regulated at the venous side of the choroid plexus capillaries by the pressure dependent fluidity $Z_{PV}$ defined by $$Z_{PV} = \frac{\overline{Q}_{AP} \cdot G(P_{perf}) - Z_{PF} \cdot (P_P - P_F)}{P_P - P_V}. \tag{117}$$

When $P_{perf} \geq 55$, this expression for $Z_{PV}$ will maintain a constant pressure difference between the choroid plexus and the ventricular CSF. Substituting $Z_{PV}$ with G=1 into the governing equation for the choroid plexus, equation (15) reduces to $$C_{PF} = \frac{dP_{PF}}{dt} = 0. \tag{118}$$

Since the compliance $C_{PF}$ must be non-zero to account for the known ability of the Choroid Plexus to transmit pressure pulsations to the ventricular CSF, the governing equation for the choroid plexus compartment becomes simply $$\frac{dP_{PF}}{dt} = 0. \tag{119}$$

This implies a constant pressure difference between the choroid plexus and ventricular CSF is maintained by equation (117) for $P_{perf} \geq 55$ mmHg. Therefore $$Q_{PF} = Z_{PF}(P_P - P_F) = Z_{PF}(\overline{P}_P - \overline{P}_F) = \overline{Q}_{PF}. \tag{120}$$

Since for pressures in the normal range, CSF production in the choroid plexus is proportional to $P_{PF}$, constant CSF production from the choroid plexus is thus achieved. Equation (119) also eliminates the need to estimate $C_{PF}$ in this model as occurrences of this parameter are always multiplied by either $dP_{PF}/dt$ or $dP_{FF}/dt$.

Using the above results, it can now be demonstrated how $Z_{pv}$ autoregulates CSF production for $P_{perf} \geq 55$ mmHg. Substituting $\overline{Q}_{PF}$ for $Z_{PF}(P_P - P_F)$ in equation (117) and noting that $\overline{Q}_{AP} - \overline{Q}_{PF} = \overline{Q}_{PV}$ results in the equalities:

$$Z_{PV} = \frac{\overline{Q}_{PV}}{P_P - P_V} \tag{121}$$

$$= \frac{\overline{Q}_{PV}}{(P_P - P_F) + (P_F - P_V)}$$

-continued $$= \frac{\overline{Q}_{PV}}{\overline{Q}_{PF}/Z_{PF} + (P_F - P_V)}.$$

The last term in this expression reveals the relationship between $Z_{PV}$ and $P_F$. Physiologically, $Z_{PV}$ should decrease with increasing CSF pressure ($P_F$) causing an increase in choroid plexus pressure and maintaining constant CSF production across $Z_{PF}$. It is quite clear from the last equality in equation (121) that this is indeed the case. These autoregulatory mechanisms may be substituted into (13) to (16) and (18) to obtain the governing equations for compartments A, C, P, V, and F.

The present model also includes a group of regulatory mechanisms associated with the sympathetic nervous system (SNS). Two variable resistances in the central and lower regions provide for SNS regulation of arterial pressure through constriction of the arterioles. Included in these variable resistances is the dramatic "last ditch stand" triggered by the SNS when arterial pressure falls to a level where cerebral blood flow is affected. The far less extreme SNS regulation of arterial pressure through a constriction of the large vascular vessels in the central body is also represented in the model. Active interfaces are placed between the central rest-of-body compartment and the central artery and vein compartments. When arterial pressure falls, forcing terms in the governing equations for compartments Y, I, and O force the volume cups at the active Y-I and Y-O interfaces into the vascular compartments, providing the regulatory constriction. An additional SNS mechanism in the model regulates central arterial pressure by increasing the number of heartbeats per minute if arterial pressure falls.

The sympathetic nervous system (SNS) is associated with reflex mechanisms that act to maintain levels of arterial pressure and cardiac output if arterial pressure falls. This section deals with the portions of the model that represent the capacity of the SNS to rapidly increase arterial pressure by constricting both the arterioles and the large vascular vessels. The model's regulation of cardiac output by the SNS will be developed below.

A first SNS pressure mechanism involves constriction of the large vessels of the circulation in the central body. If arterial pressure falls, the large vessels of the circulation in the central body, especially the veins, strongly constrict to cause a rapid increase in arterial pressure. This mechanism is included in the current model by placing active interfaces between the central compartment Y and the central vascular compartments I and O. Forcing terms in the conservation equation for compartment Y now force the volume cups at the interfaces to push into the I and O compartments when arterial pressure diminishes, modeling the SNS large vessel constriction mechanism.

The conservation equation in compartment Y is described by $$\frac{dV_Y}{dt} = \frac{dV_{YO}}{dt} + \frac{dV_{YI}}{dt} + \frac{dV_{YM}}{dt} = Q_{JY} - Q_{YO} \quad (122)$$

where the second equality determines the equation. Here, the volume change $dV_{YM}/dt$ between compartment Y and the external environment M, as in equation (3), is simply proportional to the change in pressure difference $dP_{YM}/dt$. However, $dV_{YO}/dt$ and $dV_{YI}/dt$ involve both changes in the pressure differences $dP_{YO}/dt$ and $dP_{YI}/dt$, respectively, and a forcing term describing the active compliance between Y and O and between Y and I, respectively. In particular, $$\frac{dV_{YO}}{dt} = C_{YO}\frac{dP_{YO}}{dt} + F_{YO}(t) \text{ with } F_{YO}(t) = -24P'_I \quad (123)$$

and $$\frac{dV_{YI}}{dt} = C_{YI}\frac{dP_{YI}}{dt} + F_{YI}(t) \text{ with } F_{YI}(t) = -8P'_I \quad (124)$$

The governing differential equation in compartment Y is now obtained by replacing $dV_{YO}/dt$ and $dV_{YI}/dt$ in equation (7) by the expressions (123) and (124). Similarly, for the governing equations in compartments O and I, $dV_{YO}/dt$ is replaced in equation (8) by expression (123) and $dV_{YI}/dt$ is replaced in equation (5) by expression (124), respectively.

A second SNS pressure regulation mechanism involves constriction of the arterioles in most parts of the body (excluding the brain and heart) when central artery pressure drops. This causes an increase in arterial pressure through an increase in the total peripheral resistance. When the arterial pressure drop is severe enough to compromise blood flow to the brain, this regulatory response is extreme.

To model this portion of the SNS regulatory response, two multipliers are defined for the artery-capillary fluidities $Z_{IJ}$ and $Z_{ZD}$. These variable resistances are of the form $$Z_{IJ} = \frac{\overline{Q}_{IJ}}{\overline{P}_I - \overline{P}_J} \cdot SNSz_1(P_I) \cdot SNSz(Q_{AC}) \quad (125)$$

and $$Z_{ZD} = \frac{\overline{Q}_{ZD}}{\overline{P}_Z - \overline{P}_D} \cdot SNSz_1(P_I) \cdot SNSz(Q_{AC}) \quad (126)$$

The first multiplier, $$SNSz_1(P_I) = \frac{P_I}{\overline{P}_I}, \quad (127)$$

is a function of central body artery pressure that increases resistance if $P_I$ falls below its mean level. The second multiplier, which is a function of the cerebral blood flow $Q_{AC}$, is defined by $$SNSz(Q_{AC}) = \frac{M}{1 + (M-1)e^{r(\overline{Q}_{AC} - Q_{AC})}} \text{ where} \quad (128)$$

$M = 1.1$ and $r = 0.02$.

This multiplier models the last-ditch stand when cerebral blood flow is significantly reduced. SNSz remains close to unity (not activated) until arterial pressure drops to a level where $Q_{AC}$ is affected. At this point, SNSz drops sharply, dramatically increasing the resistances $R_{IJ}$ and $R_{ZD}$.

The major source of forcing in the present whole-body model comes from the heart and involves the cardiac output $Q_{HI}$ and cardiac uptake $Q_{OH}$. Because it is known that all extra blood that flows into the heart is automatically pumped without delay into the aorta and flows again through the circulation, the cardiac output will be set equal to cardiac uptake, so that $Q_{HI}=Q_{OH}$ It is further known that the normal heart, functioning without any special stimulation, can pump an amount of venous return up to 2.5 times the normal venous return before the heart becomes the limiting factor. Therefore, a venous return function R is defined that incorporates all of the flow into the central venous compartment $$R=Q_{YO}+Q_{GO}+Z_{JO}(P_J-P_O)+Z_{TO}(P_T-P_O)+Z_{SO}(P_S-P_O)+Z_{XO}(P_X-PO) \qquad (129)$$

The cardiac uptake $Q_{OH}$ is now defined in terms of this venous return and two regulatory multipliers SNSo and OVP by $$Q_{OH}=SNS_o(P'_I) \cdot OVP(P_O) \cdot R \qquad (130)$$

where $P'_I$ denotes the time derivative of the arterial pressure function $P_I$. Since $Q_{HI}=Q_{OH}$, cardiac output is now based on the venous return through equation (130).

The multiplier SNSo in equation (130) is associated with cardiac regulation by the sympathetic nervous system (SNS). It models an SNS mechanism that increases or decreases the heart rate in response to a change in arterial pressure. A decrease in arterial pressure can markedly increase heart activity, with the heart rate increasing to as high as 160–180 bpm from the normal value of 72 bpm. A linear model for the SNSo multiplier as a function of the instantaneous time derivative $P'_I$ is $$SNSo(P'_I) = 1 - \frac{P'_I}{10}. \qquad (131)$$

This relationship produces an increase in heart rate to about twice the normal level as the result of a pressure drop of 20 mmHg. Note that SNSo (0)=1, so that this regulatory mechanism is only active when $P_I$ is changing.

The OVP function in equation (130) insures that if venous pressure drops, then so does cardiac uptake. It is defined by $$OVP(P_O) = \frac{M}{1+(M-1)e^{r(P_O-P_O)}} \qquad (132)$$

where $M = 2.5$ and $r = 0.5$.

Since $OVP(\overline{P}_O)=1$, this regulatory mechanism is not active when central venous pressure remains at its mean value.

Using the above cardiac forcing terms leads to a system of equations that describe mean pressures in the sense that the oscillations that occur about a mean pressure value are removed and the mean pressure may be considered a temporal average over one cardiac cycle. However, when trying to resolve circulatory pressure pulsations caused by cardiac output, a more instantaneous description of cardiac output is necessary. Again in this case, cardiac output is set equal to cardiac uptake.

Figure 6:
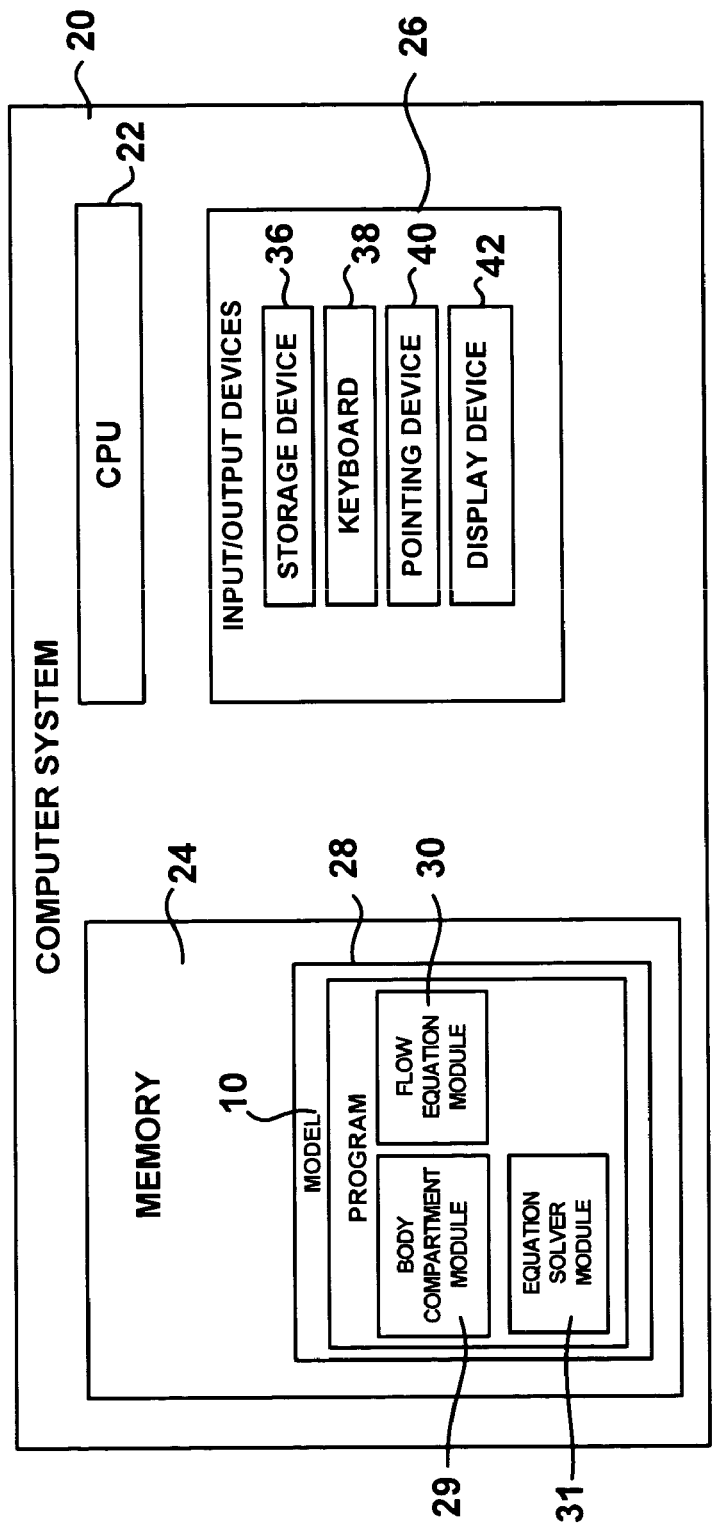
FIG. 6 is a simplified schematic of a computer system including one embodiment of the present invention.

Referring now to FIG. 6, it is contemplated that mathematical model 10 of the present invention will operate in a computing environment including a computer system 20. Computer system 20 includes a computer central processing unit (CPU) 22, a computer memory 24, and input/output devices 26. Mathematical model 10 is typically implemented with or embodied in a computer program 28 which, when executed by computing resources within computer system 20, provide the functionality of the present invention. Typically, computer program 28 resides in computer memory 24 of an individual client computer system. Of course, computer program 28 may reside in the memory of a local or wide area network server or in the memory of an equipment computer processor. In one embodiment, computer programs 28 include a body compartment module 29, a flow equation module 30, and an equation solver module 31. Body compartment module 29 includes instructions for dividing the body into a plurality of compartments and a heart pump, each compartment representing a portion of the body. Flow equation module 30 includes instructions for deriving a plurality of differential flow equations, each of which correspond to one of the compartments. Equation solver module 31 includes instructions for solving the plurality of differential flow equations. The instructions within body compartment module 29, flow equation module 30, and equation solver module 31 are executed within computer programs 28 to simulate the pressure dynamics of the intracranial system. Input/output devices 26 typically include a storage device 36, such as a hard disk drive, a keyboard 38, a pointing device 40, i.e., a mouse, and a display device 42, such as a monitor. It is contemplated that data may be manually input to mathematical model 10 via input/output devices 26 or automatically input via patient monitoring equipment or the like.

Figure 7A:
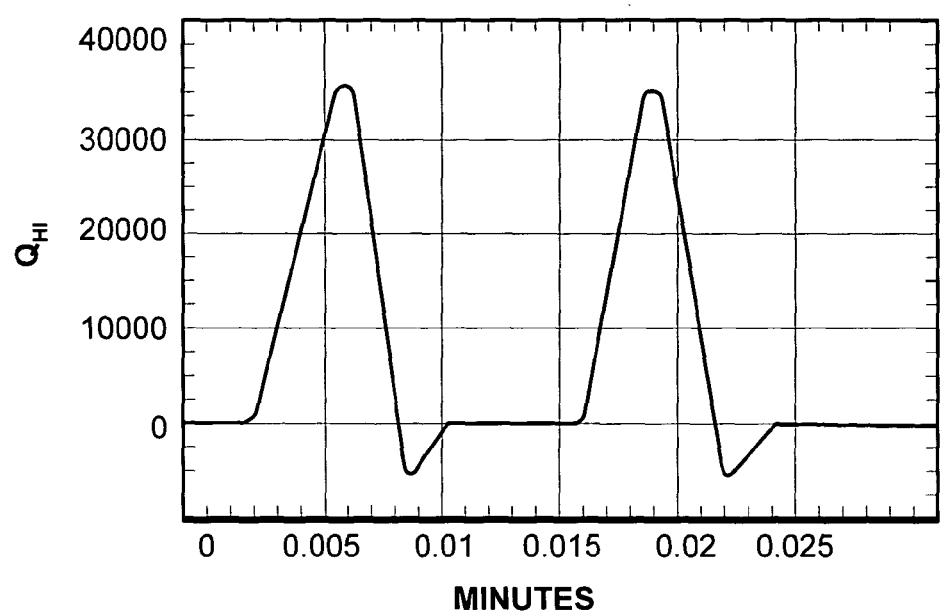
FIG. 7A is a chart of pulsatile cardiac forcing ($Q_{HI}$) over time.

To validate the present whole-body model for intracranial pressure dynamics, several types of simulations assuming normal physiology were carried out and the results compared to clinical observations. In the first type of simulation, a pulsatile form for cardiac output was introduced as forcing so that the model's predicted pressure responses could be compared to clinically measured pressure pulsations in healthy humans. The pulsatile cardiac output function with parameter values n=11, $\phi$=0.27882, and $\sigma$=5.958 was used as the cardiac forcing function ($Q_{HI}$) in the model's governing equations. This function is depicted in FIG. 7A and represents the cardiac output over two cycles. A mean value for central artery pressure of 96 mmHg was prescribed as an initial condition for the first simulation. In the second type of simulation, a constant flow infusion test was used to validate the model's representations for variable intracranial compliances and intracranial fluid dynamics. In these simulations, the governing equation for the extra-ventricular CSF compartment (T) was augmented by adding a constant infusion term to model the clinical infusion of mock CSF into the lower lumbar space.

With the lower body region explicitly represented by separate compartments in the present model, the effect of orthostatic forces on cerebral blood flow as the body changes position can be considered. Two additional types of simulations were now run to validate the modeling of the regulatory mechanisms associated with the systemic nervous system. The normal physiology value for the resistance $R_{XO}$ was increased twofold and $R_{JZ}$ was decreased by one half to simulate a change in body position from lying down to standing up, and the behavior of the cerebral blood flow $Q_{AC}$ was then examined. These resistance changes were made instantaneously and the modeled effect on cerebral blood flow was determined for the next 30 seconds. In the first simulation of this type, the model equations included all of the SNS reflexes described above. In the second simulation, the SNS terms were removed from the governing equations.

To examine the potential predictive capabilities of the model in pathological conditions, simulations were run where all cardiac forcing in the model was suddenly stopped to simulate cardiac arrest, i.e., $Q_{Hi}$ and $Q_{OH}$ were suddenly set equal to zero. A blood volume of 5600 ml was assumed in these simulations, and the response of pressures in the model's circulatory compartments was determined. This behavior, and the predicted final circulatory compartmental pressure values, were then compared to clinical results associated with cardiac arrest and the filling pressure of the circulation.

As a second example of pathology, simulations of hemorrhagic shock were carried out. Hemorrhage was modeled by the inclusion of an outflow path, denoted $Q_{XM}$, from lower venous compartment X into ambient atmosphere compartment M. This flow was calculated so as to achieve a 45% loss in blood volume at the end of the simulation. The percent changes in central artery pressure, cardiac output, and cerebral blood flow were then calculated with respect to percent blood loss.

In all of these simulations, the model's system of differential equations was solved numerically using a typical symbolic mathematical software package employing maximum accuracy settings.

Figure 7B:
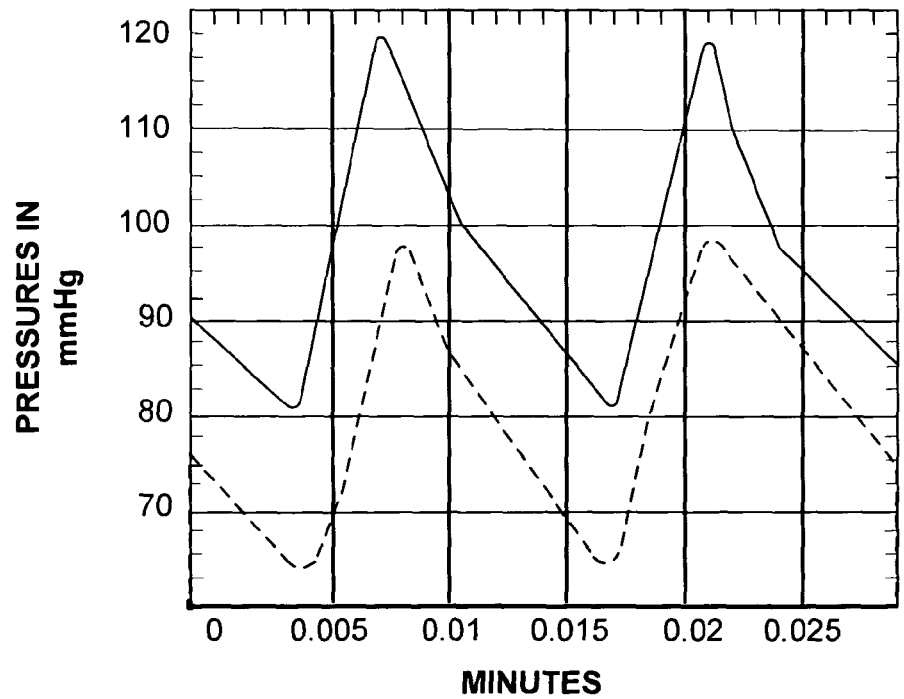
FIG. 7B is a chart of the 120/80 central artery pressure response over time (solid) and the 100/65 intracranial artery pressure response (dashed)

The usual systolic and diastolic values of pulsatile central artery pressure are perhaps the best-known values in human physiology. FIG. 7B shows the behavior of central artery pressure predicted by the present model in response to the pulsatile cardiac forcing developed in the prior art. The model's predicted response to a mean value of 96 mmHg, prescribed as an initial condition, reproduces a peak systolic pressure of 120 mmHg and a diastolic pressure of 80 mmHg. FIG. 7B also depicts the intracranial artery pressure response. Here, the predicted systolic and diastolic pressures are "100 over 65." These values are typical of those in the small arteries.

Because even the most complex mathematical model must be based on assumptions and simplifications of actual physiology, model validation is an essential step in the development process. In the present case, after calibration of parameters associated with healthy human physiology, the model was used in two types of simulations and the results compared to physical data. In the first type of simulation, the response of compartmental pressures to the realistic pulsatile cardiac output given in FIG. 7A was determined. As shown in FIG. 7B the predicted response of central arterial pressure is the typical "120 over 80" blood pressure readings expected in healthy humans. It is worth noting that a mild incisura (dicrotic notch) is discernable in this pressure curve. This notch is typical in central artery pressure readings, although is it usually more pronounced than in FIG. 7B. In particular, the present model cannot capture reflected waves which have a tendency to cause a second (usually higher) systolic peak and hence a more prominent inflection point.

The response of the intracranial arteries is also shown in FIG. 7B. This response agrees well with prior art estimates for pressure pulses in the small arteries. The pressure responses of other intracranial compartments were also within expected ranges.

Constant flow infusion tests were also simulated using the present model. In these experiments, mock CSF was infused at a constant rate into the lower lumbar space. The pressure of this space was then measured and associated with a calculated total CSF volume change. This resulted in determination of a curve known as the global pressure-volume relation. The slope of this curve describes the elastance of the entire CSF space, including extracranial portions. The inverse of the elastance is the more well-know compliance.

The typical clinical global CSF pressure-volume relation, except at extreme pressures, is an S-shaped curve of logistic type. It has a lower pressure plateau near resting pressure, defined as the pressure where CSF production in the system is just balanced by CSF absorption by the venous system. This region of small slope (large compliance) is due to the ability of the system to easily accommodate increases in the volume of the CSF space at these relatively low pressures through the compression of the venous system (excluding the venus-sinus veins). As additional CSF volume is added to the system and pressures increase, this capacity for adjustment diminishes as there will be less venous blood available to eject to further compress the veins. Thus, with increasing pressures, the pressure-volume curve steepens indicating a reduction in the compliance of the system. The slope of the pressure-volume relationship continues to increase for larger infusion volumes until the resulting CSF pressures are high enough that the intracranial arteries can begin to be compressed. At this point, some additional compliance enters the system. There is a point of inflection in the curve followed by a region of decreasing slope that leads to an upper pressure plateau at the diastolic pressure of the intracranial arteries. Once additional volume increases beyond this point increase CSF pressures to the systolic pressure of the intracranial arteries, there are no additional mechanisms available to buffer additional volume increases, and the compliance of the CSF system falls to zero.

Figure 8A:
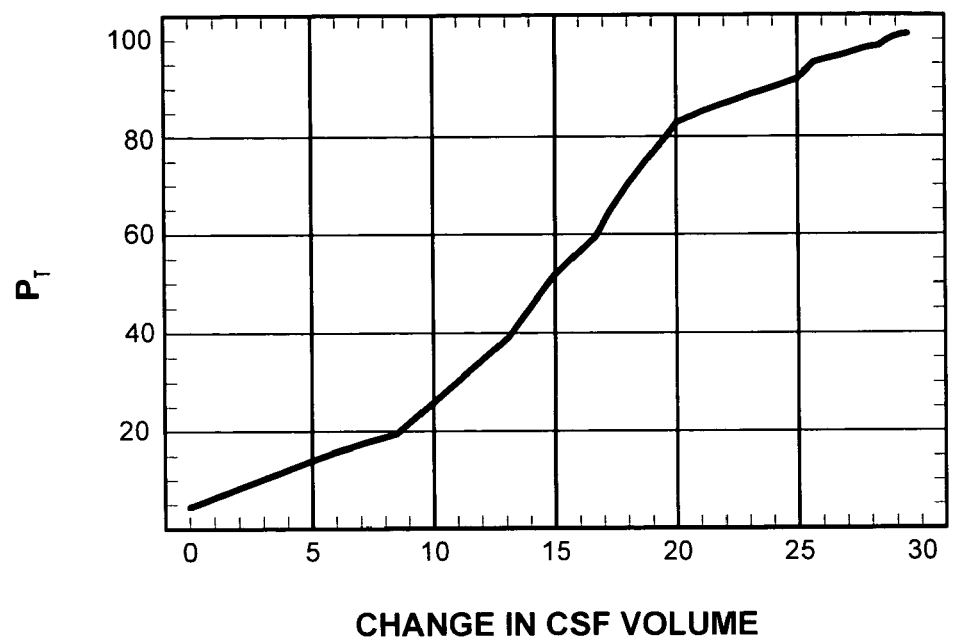
FIG. 8A is a chart of the predicted CSF pressure vs. volume.

The pressure-volume relation obtained by using the present model to simulate CSF infusion tests is given in FIG. 8A. The pressure in this figure is the pressure $P_T$ of the extraventricular CSF compartment since this compartment contains the lower lumber portion of CSF space where clinical pressure recordings were made. The volume change in FIG. 8A represents the net change of both ventricular and extra-ventricular CSF volumes combined, as this is the quantity calculated in the experiments. The logistic-like shape of the predicted pressure-volume relationship is maintained until CSF pressures reach high values comparable to the systolic blood pressure. At this point, the curve turns upward and compliance rapidly decreases.

The same infusion simulations that led to the pressure-volume relationship in FIG. 8A may also be used to calculate a relationship between CSF pressure increases and CSF absorption. The slope of this relationship is known as the conductance of CSF outflow and is denoted by $C_{out}$. In model simulations, this value is easily calculated by $$C_{out}^m(t) = \frac{Z_{TS}(P_T(t) - P_S(t)) + Z_{TO}(P_T(t) - P_O(t)) - (\overline{Q}_{TS} + \overline{Q}_{TO})}{P_T(t) - \overline{P}_T} \quad (133)$$

where the superscript m denotes the model calculation and t denotes the time in minutes from the start of the simulated infusion. FIG. 5B illustrates the predicted conductance of CSF outflow throughout ten minutes of an infusion simulation.

Figure 8B:
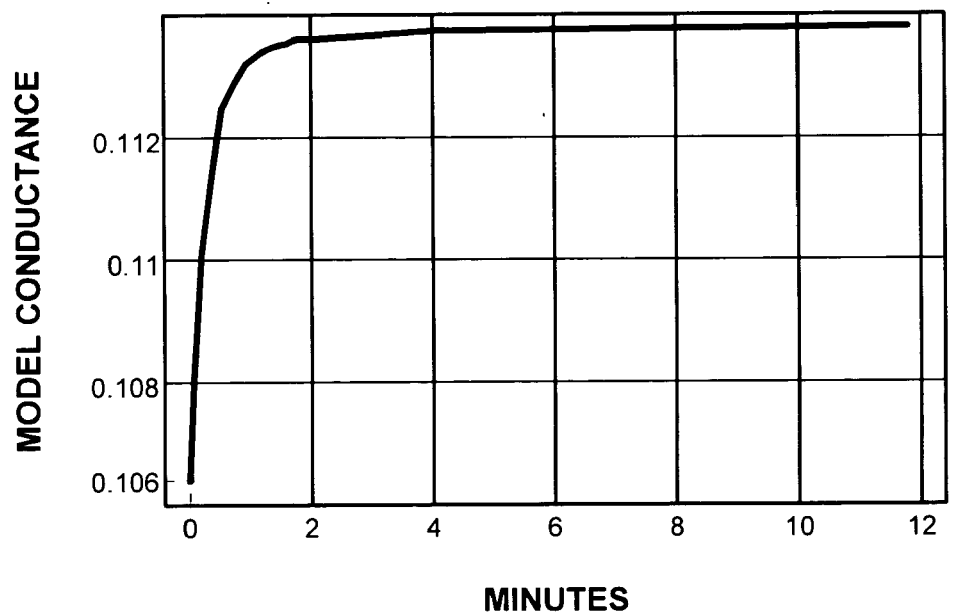
FIG. 8B is a chart of conductance to CSF output according to one embodiment of the present invention.

When $C_{out}$ has been has been studied experimentally, a linear relationship between CSF pressure increase and CSF absorption is observed. In prior art experiments, a mean value for $C_{out}$ of 0.11 (mlmin)/mmHg is given for a sample of eight healthy volunteers, and it is stated that a value greater than 0.10 is probably normal. The values of the conductance of CSF outflow calculated from the present simulations are shown in FIG. 8B. These values change with time, but stay within 0.004 units of the mean value of 0.11 (ml/min)/mmHg observed in the prior art. They are also greater than 0.10 as previously suggested.

Furthermore, the calculated temporal variation of $C_{out}^m$ is sufficiently small that that the relationship between CSF pressure increase and CSF absorption might easily be categorized as linear on the basis of clinical data.

Figure 9:
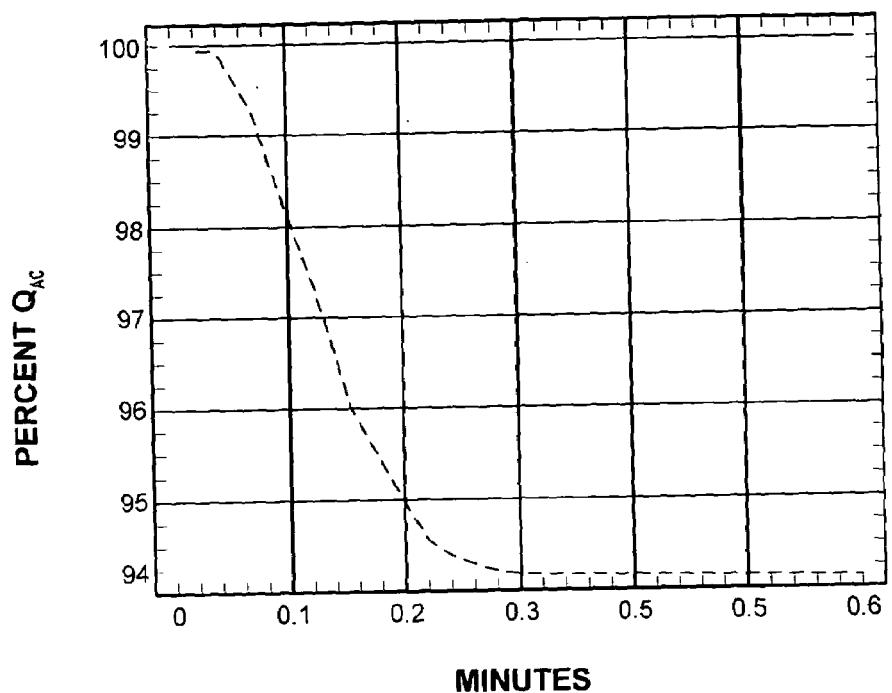
FIG. 9 is a chart of the percentage of $Q_{AC}$ drop due to a positional change with all SNS reflexes activated (solid) and without any SNS reflexes included (dashed)

In the current model calibrations, the pressures, flows, and hence resistances are determined from data associated with the body being in the horizontal (supine) position. Gravitational influences on the circulation will change when the body changes position. Upon standing up, the blood flow into the lower body is aided by gravity, but the venous return from the lower body is hindered by it. As the lower body in the present model is represented by separate compartments, the effect of a positional change can be considered. To simulate the gravity-induced changes associated with standing up, the resistance into the lower arteries ($R_{IZ}$) may be decreased by one half while the resistance from the lower veins ($R_{XO}$) is doubled. This results in pressure and volume increases of the lower arteries and veins. In the current simulations, these resistance changes were made instantaneously and the modeled effect on cerebral blood flow was determined for the next 30 seconds. In the first simulation, all sympathetic nervous system (SNS) reflexes are intact and in the second 39 these are removed. As can be seen in FIG. 9, with all SNS reflexes activated, cerebral blood flow is maintained at 100% of its original value.

Referring now to FIG. 9, the results of modifying the resistances between the central and lower body in the model to simulate a change in body position from lying down to standing up are illustrated. The solid curve in FIG. 9 indicates the response of cerebral blood flow to this change in position with the SNS reflexes included in the model equations. The simulation predicts that with all SNS reflexes activated, cerebral blood flow is maintained at 100% by the model through the change in body position. The dashed curve in FIG. 9 shows the predicted behavior of cerebral blood flow in the absence of regulation by the SNS.

When the SNS reflexes are removed from the model equations, cerebral blood flow drops to about 94% of its original value due to the positional change. This predicted decrease indicates the important role that the SNS regulatory mechanisms play in the maintenance of cerebral blood flow in the model. The decrease also confirms that loss of the SNS reflexes can be a factor in orthostatic intolerance. Syncope, or fainting, is a common event with many different causes. Syncope can be due to sudden vasodilatation (vasodepressor or "vasovagal" syncope) as well as postural hypotension, in which the normal vasoconstrictive reflex response to a transiently decreased cardiac output on standing is not sufficiently active. Postural hypotension can occur as the result of drugs, venous disease, sympathectomy, hypovolemia, peripheral neuropathy, in addition to degeneration of the sympathetic nervous system (primary autonomic insufficiency, or idiopathic orthostatic hypotension). Common to all causes of syncope is a decrease in cerebral blood flow to under 30 ml per 100 g brain tissue per minute from the usual 50–55 ml, about 55% of normal. This is well above the threshold for loss of electrical function, at 30% of normal, but is enough to cause a transient loss of consciousness. The calculated percentage decrease in cerebral blood flow in the current simulation with the SNS terms in the model equations omitted does not approach the levels associated with fainting due to a rapid change in position as the result of standing up too quickly, even with inactive SNS reflexes. However, cerebrovascular autoregulation in the current simulation remains uncompromised and will act to maintain cerebral blood flow despite sudden decreases in arterial pressure.

To demonstrate the potential predictive capabilities of the model in pathology, two situations were simulated. In the first of these, a simplified representation of cardiac arrest was created by suddenly terminating all cardiac forcing, i.e., setting $Q_{HI}=Q_{OH}=0$, at a specified time in the course of the simulation. In prior research by Gutyon, it is noted that "When heart pumping is stopped . . . the flow of blood everywhere in the circulation ceases a few seconds later. Without blood flow, the pressures everywhere in the circulation become equal after a minute or so. This equilibrated pressure level is called the mean circulatory filling pressure . . . at a volume 40 of 5000 ml, the filling pressure is the normal value of 7 mmHg." Predicted results from the simulation were consistent with this statement. When all cardiac forcing was stopped in the simulation, all circulatory pressures tend to 7.5 mmHg after about 45 seconds. The small difference in the predicted and cited filling pressures may be partially due to the fact that total blood volume in the simulation was taken to be 5600 ml rather than the 5000 ml.

Figure 10:
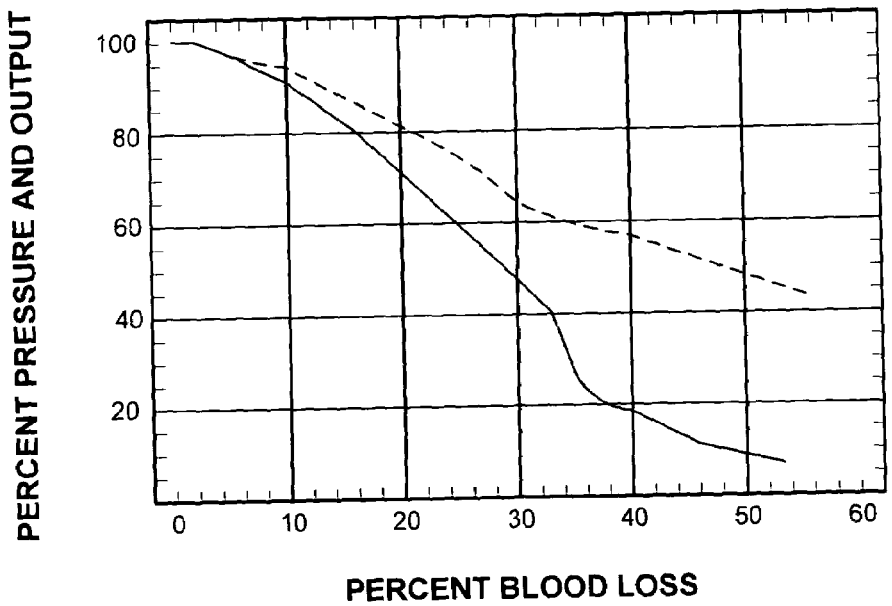
FIG. 10 is a chart of percentage decrease of $\overline{P}_I$ (solid) and of $\overline{Q}_{HI}$ (dashed) as a function of percentage blood loss due to hemorrhage.

Referring now to FIG. 10, the second pathological situation considered as a test of the model's capabilities involves the effects of shock caused by hypovolemia. In these simulations, a flow term $Q_{XM}$ was introduced into the equation for compartment X to model a hemorrhage from the lower body. Prior art research by Guyton gives a clinically-derived graph that, as in FIG. 10, depicts the percentage drop in central artery pressure ($P_I$) and cardiac output ($Q_{HI}$) with respect to percent blood loss. Consistent with these clinical results, the modeled response shows very stable pressure and cardiac output over the first 10% blood loss, and the relative arterial pressure stays above relative output during the entire course of the hemorrhage. At 30% blood loss, the relative drops in pressure and cardiac output are also in close agreement with the clinical results. During the course of the simulated hemorrhage, the central venous compartment contracts to less than 50% of its original volume, indicating that the active interface (SNSc) in the model is causing the central veins to strongly constrict in order to maintain blood flow back to the heart. Beyond 30% blood loss, a second arterial plateau is noticed in FIG. 10. This important feature, which is also noted in the clinical results, is due to the "last-ditch stand" reflex to maintain blood supply to the brain provided by the regulatory multiplier SNSz ($Q_{AC}$) in equation (130).

Figure 11:
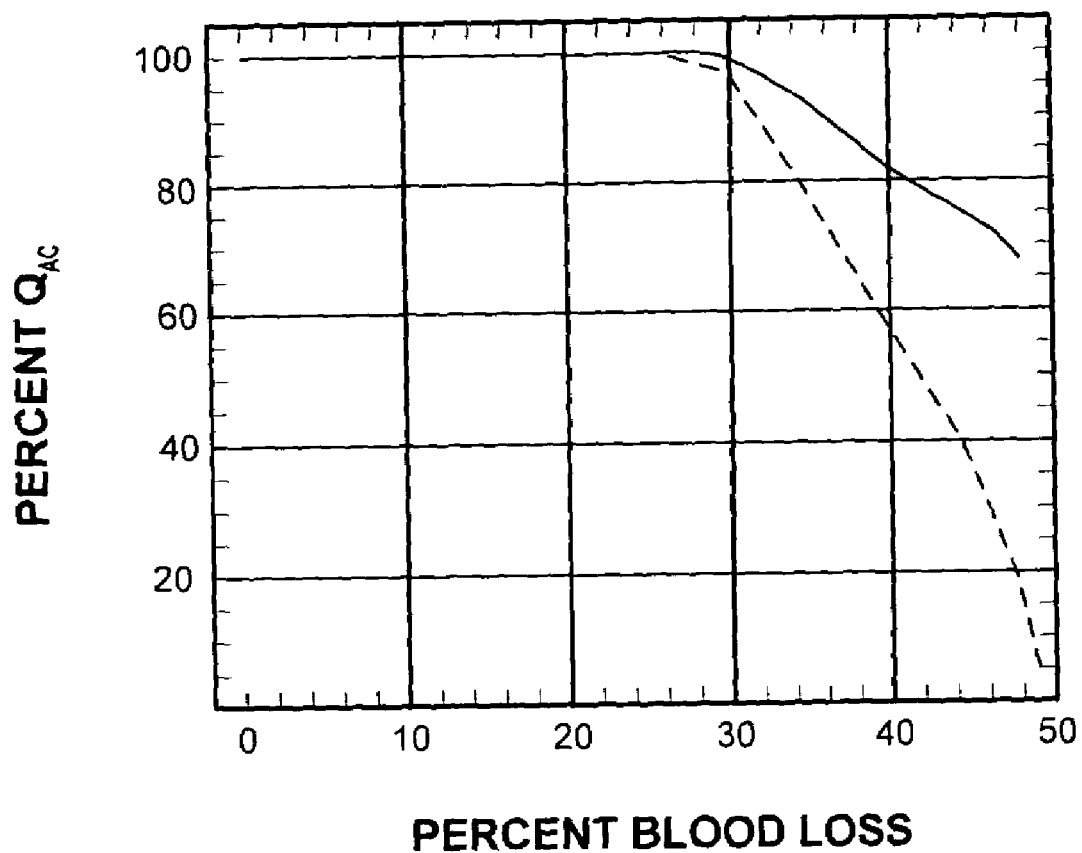
FIG. 11 is a chart of the predicted percentage of $Q_{AC}$ drop vs. percentage of blood loss due to hemorrhage with both SNSz reflexes activated (solid) and no SNSz reflexes included (dashed).

Referring now to FIG. 11, the predicted percentage drop in cerebral blood flow ($Q_{AC}$) with respect to percent blood loss during the simulated hemorrhage is illustrated. The solid curve represents results when both SNSz mechanisms are intact, and the dashed curve represents results when both SNSz mechanisms are disabled. Both simulations predict that a 25% blood loss can be tolerated without a significant reduction in cerebral blood flow. Above this degree of blood loss, with the SNS mechanisms intact, the blood supply to the brain remains above 75% of its original value. However, without these SNS regulatory mechanisms included in the model's equations, cerebral blood flow drops quickly to 20% its original value.

The role of the SNS regulatory mechanisms in maintaining adequate central artery pressure and cardiac output has been noted above. However, the need to include the arteriole constrictive reflex SNSz in a model of intracranial pressure dynamics when simulating pathology is also dramatically illustrated by the behavior of cerebral blood flow as a function of blood loss in the hemorrhage simulations. Due to the intracranial autoregulatory mechanism $Z_{AC}$ in the model, a 25% blood loss can be tolerated without significant reduction in cerebral blood flow. Beyond this point, arteriole constriction is essential to further maintain adequate levels of cerebral blood flow. As indicated in FIG. 11, predicted cerebral blood flow $Q_{AC}$ remains above 80% of its original value from a 25% blood loss through a 40% blood loss. By contrast, in an analogous simulation where the arteriole constrictive response was disabled, $Q_{AC}$ falls to approximately 55% of its original value when a 40% blood loss has occurred. Between a 40% and 45% blood loss, $Q_{AC}$ remains above 75% of its original value with the arteriole constrictive response intact, but falls rapidly from 55% to approximately 20% of its original value with the arteriole constrictive response disabled.

Most attempts to study intracranial pressure using lumped-parameter models have adopted the classical "Kellie-Monro Doctrine," which considers the intracranial space to be a closed system that is confined within the nearly-rigid skull, conserves mass, and has equal inflow and outflow. The present work revokes this Doctrine and develops a mathematical model for the dynamics of intracranial pressures, volumes, and flows that embeds the intracranial system in extensive whole-body physiology. The new model consistently introduces compartments representing the tissues and vasculature of the extradural portions of the body, including both the thoracic region and the lower extremities. In addition to vascular connections, a spinal subarachnoid cerebrospinal fluid (CSF) compartment bridges intracranial and extracranial physiology allowing explicit buffering of intracranial pressure fluctuations by the spinal theca. The model contains cerebrovascular autoregulation, regulation of systemic vascular pressures by the sympathetic nervous system, regulation of CSF production in the choroid plexus, a lymphatic system, colloid osmotic pressure effects, and realistic descriptions of cardiac output.

Validation tests show that the model's predictions are in agreement with experimental data for normal physiology. Additional simulations indicate that the present whole-body model appears to have significant potential predictive capabilities in situations involving pathological conditions.

One embodiment of the present invention has been disclosed and discussed herein, although it should be understood that the present invention is not limited to this (or any other) particular embodiment. On the contrary, the present invention is intended to cover all alternatives, modifications and equivalents that may be included within the spirit and scope of the appended claims.

What is claimed is:

1. A method of mathematically modeling pressure dynamics of a body's intracranial system comprising the steps of:
   dividing the body into a plurality of compartments and a representation of a heart pump, said plurality of compartments including at least one intracranial compartment and at least one extracranial compartment, each of said plurality of compartments representing a portion of the body, said representation of a heart pump interacting with at least one of said plurality of compartments;
   deriving a plurality of differential equations, each of said plurality of differential equations governing a pressure dynamic of one of said plurality of compartments;
   defining an atmosphere compartment, said atmosphere compartment representing a space located outside the body and wherein at least one of said plurality of differential equations accounts for a pressure of said atmosphere compartment;
   solving said plurality of differential equations; and
   producing a modeled circulatory system dynamic of the body based on said solving of said plurality of differential equations.

2. A method according to claim 1, wherein at least one of said plurality of differential equations accounts for cerebrovascular autoregulation byte body's sympathetic nervous system.

3. A method according to claim 1, wherein said plurality of compartments include a plurality of vascular compartments.

4. A method according to claim 3, wherein said plurality of vascular compartments include a plurality of intracranial compartments.

5. A method according to claim 4, wherein said plurality of intracranial compartments represent at least one of the intracranial arteries, intracranial capillaries, choroids plexus capillaries, venous sinus jugular veins, and intracranial veins.

6. A method according to claim 3, wherein said plurality of vascular compartments include a plurality of central body compartments.

7. A method according to claim 6, wherein said plurality of central body compartments represent at least one of the central arteries, central capillaries, central veins, and extra-ventricular CSF.

8. A method according to claim 3, wherein said plurality of vascular compartments include a plurality of lower body compartments.

9. A method according to claim 8, wherein said plurality of lower body compartments represent at least one of the lower arteries, lower capillaries, and lower veins.

10. A method according to claim 1, wherein said plurality of compartments include a plurality of non-vascular compartments.

11. A method according to claim 10, wherein said plurality of non-vascular compartments represent at least one of the lower tissue, brain, ventricular CSF, and extra-ventricular CSF.

12. A method according to claim 1, wherein said plurality of compartments include a rest of body compartment.

13. A method according to claim 1, wherein at least one of said plurality of differential equations include a term representing pressure flow into and/or out of a corresponding one of said plurality of compartments.

14. A method according to claim 1, wherein said plurality of differential equations include an equation simulating fluid filtration from capillaries into interstitial space.

15. A method according to claim 1, wherein said plurality of differential equations include an expression simulating deformation of the membrane between adjacent compartments.

16. A system for modeling an intracranial system comprising:
   a body compartment module adapted to divide the body into a plurality of compartments and a representation of a heart pump, said plurality of compartments including at least one intracranial compartment and at least one extracranial compartment, each of said plurality of compartments representing a portion of the body;
   an atmosphere compartment, said atmosphere compartment representing a space located outside the body;
   an equation module adapted to derive a plurality of differential equations, each of said plurality of differential equations governing a pressure dynamic of one of said plurality of compartments;
   an equation solver module adapted to solve said plurality of differential equations wherein at least one of said plurality of differential equations accounts for a pressure of said atmosphere compartment; and an output device adapted to output a result from said equation solver as a model of a circulatory system dynamic of the body.

17. A system according to claim 16, wherein at least one of said plurality of differential equations accounts for cerebrovascular autoregulation by the body's sympathetic nervous system.

18. A system according to claim 16, wherein said plurality of compartments include a plurality of vascular compartments.

19. A system according to claim 18, wherein said plurality of vascular compartments include a plurality of intracranial compartments.

20. A system according to claim 19, wherein said plurality of intracranial compartments represent at least one of the intracranial arteries, intracranial capillaries, choroids plexus capillaries, venous sinus jugular veins, and intracranial veins.

21. A system according to claim 18, wherein said plurality of vascular compartments include a plurality of central body compartments.

22. A system according to claim 21, wherein said plurality of central body compartments represent at least one of the central arteries, central capillaries, central veins, and extra-ventricular CSF.

23. A system according to claim 18, wherein said plurality of vascular compartments include a plurality of lower body compartments.

24. A system according to claim 23, wherein said plurality of lower body compartments represent at least one of the lower arteries, lower capillaries, and lower veins.

25. A system according to claim 16, wherein said plurality of compartments include a plurality of non-vascular compartments.

26. A system according to claim 25, wherein said plurality of non-vascular compartments represent at least one of the lower tissue, brain, ventricular CSF, and extra-ventricular CSF.

27. A system according to claim 16, wherein said plurality of compartments include a rest of body compartment.

28. A system according to claim 16, wherein at least one of said plurality of differential equations include a term representing a pressure flow into and/or out of a corresponding one of said plurality of compartments.

29. A system according to claim 16, wherein said plurality of differential equations include an equation simulating fluid filtration from capillaries into interstitial space.

30. A system according to claim 16, wherein said plurality of differential equations include an expression simulating deformation of the membrane between adjacent compartments.

31. A method of modeling pressure dynamics of an intracranial system comprising the steps of:
dividing a body into a plurality of compartments and a representation of a heart pump, each of said plurality of compartments representing a portion of the body, said plurality of compartments including at least one intracranial compartment and at least one extracranial compartment, said representation of a heart pump interacting with at least one of said plurality of compartments;
establishing an atmosphere compartment, said atmosphere compartment representing a space located outside the body;
deriving a plurality of differential equations, each of said plurality of differential equations governing a pressure dynamic of one of said plurality of compartments, wherein at least one of said differential equations accounts for cerebrovascular autoregulation by a sympathetic nervous system, wherein at least one of said plurality of differential equations accounts for a pressure of said atmosphere compartment;
solving said plurality of differential equations; and
producing a modeled circulatory system dynamic of the body based on said solving of said plurality of differential equations.

32. A method of modeling pressure dynamics of an intracranial system comprising the steps of:
dividing a body into a plurality of compartments, each of said plurality of compartments representing a portion of the body, said plurality of compartments including at least one intracranial compartment and at least one extracranial compartment;
establishing an atmosphere compartment, said atmosphere compartment representing a space located outside the body;
providing a means for representing a heart pump that interacts with at least one of said plurality of compartments;
deriving a plurality of differential equations, each of said plurality of differential equations governing a pressure dynamic of one of said plurality of compartments, wherein at least one of said differential equations includes a means to account for cerebrovascular autoregulation by a sympathetic nervous system, wherein at least one of said plurality of differential equations accounts for a pressure of said atmosphere compartment; and
solving said plurality of differential equations; and
producing a modeled circulatory system dynamic of the body based on said solving of said plurality of differential equations.

33. A method of modeling pressure dynamics of an intracranial system comprising the steps of:
providing a means for dividing a body into a plurality of compartments and a representation of a heart pump, each of said plurality of compartments representing a portion of the body, said plurality of compartments including at least one intracranial compartment and at least one extracranial compartment, said representation of a heart pump interacting with at least one of said plurality of compartments;
providing a means for establishing an atmosphere compartment, said atmosphere compartment representing a space located outside the body;
providing a means for deriving a plurality of differential equations, each of said plurality of differential equations governing a pressure dynamic of one of said plurality of compartments and said atmosphere compartment; and
providing a means for solving said plurality of differential equations and producing a modeled circulatory system dynamic of the body based on said solving of said plurality of differential equations.

34. A method of modeling pressure dynamics of a body's intracranial system comprising the steps of:
dividing the body into a plurality of compartments and a representation of a heart pump, each of said plurality of compartments representing a portion of the body, said plurality of compartments including at least one intracranial compartment and at least one extracranial compartment, said representation of a heart pump interacting with at least one of said plurality of compartments, wherein a plurality of said plurality of compartments are vascular and a plurality of said plurality of compartments are non-vascular, said vascular compartments including at least one of the intracranial arteries, intracranial capillaries, choroids plexus capillaries, venous sinus jugular veins, intracranial veins, central arteries, central capillaries, central veins, extra-ventricular CSF, lower arteries, lower capillaries, and lower veins, said non-vascular compartments including at least one of lower tissue, brain, ventricular CSF, and extra-ventricular CSF;

establishing an atmosphere compartment, said atmosphere compartment representing a space located outside the body;

deriving a plurality of differential equations, each of said plurality of differential equations governing a pressure dynamic of one of said plurality of compartments and said atmosphere compartment;

solving said plurality of differential equations; and producing a modeled circulatory system dynamic of the body based on said solving of said plurality of differential equations.

35. A mathematical model for simulating pressure dynamics of an intracranial system, comprising:

a means for dividing the body into a plurality of compartments and a representation of a heart pump, each of said plurality of compartments representing a portion of the body, said plurality of compartments including at least one intracranial compartment and at least one extracranial compartment;

a means for establishing an atmosphere compartment, said atmosphere compartment representing a space located outside the body;

a means for deriving a plurality of differential equations, each of said plurality of differential equations go veining a pressure dynamic of one of said plurality of compartments and said atmosphere compartment;

a means for solving said plurality of differential equations; and a means the outputting a modeled circulatory system dynamic of the body based on said solving of said plurality of differential equations.

* * * * *

UNITED STATES PATENT AND TRADEMARK OFFICE
CERTIFICATE OF CORRECTION

PATENT NO. : 7,182,602 B2
APPLICATION NO. : 10/658638
DATED : February 27, 2007
INVENTOR(S) : William D. Lakin et al.

It is certified that error appears in the above-identified patent and that said Letters Patent is hereby corrected as shown below:

Column 30, line 3, delete "byte" and insert -- by the -- therefor.

Column 34, line 11, delete "go veining" and insert -- governing -- therefor.

Column 34, line 16, delete "the" and insert -- for -- therefore.

Signed and Sealed this

Tenth Day of July, 2007

JON W. DUDAS
*Director of the United States Patent and Trademark Office*